United States Patent
Mathewson et al.

(10) Patent No.: US 7,117,277 B2
(45) Date of Patent: Oct. 3, 2006

(54) FLEXIBILITY OF DESIGN OF A BUS INTERCONNECT BLOCK FOR A DATA PROCESSING APPARATUS

(75) Inventors: Bruce James Mathewson, Cambridge (GB); Antony John Harris, Sheffield (GB)

(73) Assignee: ARM Limited, Cambridge (GB)

( * ) Notice: Subject to any disclaimer, the term of this patent is extended or adjusted under 35 U.S.C. 154(b) by 170 days.

(21) Appl. No.: 10/847,576

(22) Filed: May 18, 2004

(65) Prior Publication Data

US 2004/0267994 A1 Dec. 30, 2004

(30) Foreign Application Priority Data

Jun. 12, 2003 (GB) .................................. 0313648.8

(51) Int. Cl.
*G06F 3/00* (2006.01)
(52) U.S. Cl. .............................. 710/58; 710/60; 710/52
(58) Field of Classification Search .................. 710/15, 710/17, 29, 51–52, 56, 58, 60–61, 110, 316–317; 703/13, 19; 716/6, 12
See application file for complete search history.

(56) References Cited

U.S. PATENT DOCUMENTS

| | | | |
|---|---|---|---|
| 4,162,535 A | | 7/1979 | Anderson |
| 4,731,724 A | | 3/1988 | Michel et al. |
| 5,638,291 A | * | 6/1997 | Li et al. ........................ 716/18 |
| 5,859,776 A | * | 1/1999 | Sato et al. ................... 700/121 |
| 6,023,742 A | | 2/2000 | Ebeling et al. |
| 6,044,448 A | * | 3/2000 | Agrawal et al. ................ 712/9 |
| 6,117,182 A | * | 9/2000 | Alpert et al. ................... 716/8 |
| 6,832,180 B1 | * | 12/2004 | Sutera et al. .................. 703/13 |
| 6,910,195 B1 | * | 6/2005 | Akkiraju ........................ 716/6 |

OTHER PUBLICATIONS

ARM PrimeCell infrastructure AMBA 3 AXI Register Slice, Technical Overview, Copyright 2004.*
AMBA AXI Protocol, Specification, v1.0, pp. 20-24, section 1-2 to 1-6, copyright 2003, 2004.*

* cited by examiner

*Primary Examiner*—Khanh Dang
(74) *Attorney, Agent, or Firm*—Nixon & Vanderhye P.C.

(57) ABSTRACT

A method and design tool are provided for modifying a design of a bus interconnect block for a data processing apparatus in order to meet a requirement for a chosen characteristic of the bus interconnect block. The bus interconnect block provides a plurality of connections via which one or more master devices may access one or more slave devices, each connection comprising one or more paths, and each path having one or more path portions separated by storage elements. The method comprises the steps of: (a) selecting one or more candidate paths from said paths; (b) for each candidate path, applying predetermined criteria to determine whether modification of the number of storage elements in said path will assist in meeting the requirement for said chosen characteristic; and (c) modifying the number of storage elements in each candidate path for which it is determined at said step (b) that modification will assist in meeting the requirement for said chosen characteristic. Such an approach allows design modifications to be made iteratively with limited impact on previously made decisions, and allows design modifications to be considered and implemented on a connection-by-connection basis.

15 Claims, 12 Drawing Sheets

FLEXIBILITY OF DESIGN OF A BUS INTERCONNECT BLOCK FOR A DATA PROCESSING APPARATUS

BACKGROUND OF THE INVENTION

1. Field of the Invention

The present invention relates to data processing apparatus, and in particular to techniques for improving the flexibility of the design of a bus interconnect block for such data processing apparatus.

2. Description of the Prior Art

The design of components for a data processing apparatus is a labour intensive task, and becomes more complex as data processing apparatus increase in complexity. One such component is a bus interconnect block which is used to define the bus connections between various other components within the data processing apparatus. In particular, the bus interconnect block will define the bus infrastructure that allows a number of master devices to access a number of slave devices. As data processing apparatus increase in complexity, the number of master and slave devices to be interconnected increases, as do the number of ways in which those master and slave devices can be connected. This significantly increases the complexity of the design of the bus interconnect block, and in particular the various connections specified by the bus interconnect block. There will be various characteristics of the bus interconnect block which will need to be taken into account when designing the bus interconnect block, for example timing characteristics, power consumption characteristics, etc. Any design choice that is made during the design of the bus interconnect block in order to seek to meet a requirement for a particular chosen characteristic (e.g. to improve a timing characteristic) will typically be replicated across all of the connections specified by the bus interconnect block, and whilst this can assist in meeting the requirement for the chosen characteristic, it can prove sub-optimal, and can result in the introduction of other undesirable characteristics which then need addressing.

Accordingly, it would be desirable to provide a methodology and design tool which would assist in the design of a bus interconnect block, and which would allow design modifications to be made iteratively with limited impact on previously made design decisions.

SUMMARY OF THE INVENTION

Viewed from a first aspect of the present invention, the invention provides a method of modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each path having one or more path portions separated by storage elements, the method comprising the steps of: a) selecting one or more candidate paths from said paths; b) for each candidate path, applying predetermined criteria to determine whether modification of the number of storage elements in said path will assist in meeting the requirement for said chosen characteristic; and (c) modifying the number of storage elements in each candidate path for which it is determined at said step (b) that modification will assist in meeting the requirement for said chosen characteristic.

In accordance with this aspect of the invention, storage elements are selectively introduced into paths within the bus interconnect block in order to separate those paths into distinct path portions, with the aim of meeting a requirement for a chosen characteristic of the bus interconnect block, for example an improvement in timing, a reduction in power consumption, etc. The methodology used to determine where to place such storage elements involves selecting one or more candidate paths from the various paths provided within the bus interconnect block, such selection being dependent on the requirement for the chosen characteristic that it is being sought to be met, and then for each candidate path applying predetermined criteria to determine whether modification of the number of storage elements in that path (whether that be increasing the number or decreasing the number of storage elements) will assist in meeting that requirement for the chosen characteristic. Again, it will be appreciated that the predetermined criteria to be applied will depend on the requirement for the chosen characteristic that it is seeking to meet. Assuming it is determined that the modification of the number of storage elements will assist in meeting the requirement for the chosen characteristic, then a revised design is produced in which the number of storage elements is modified. It will be appreciated that this approach could be repeated iteratively until the requirement for the chosen characteristic has been met to a desired level. Furthermore, it will be appreciated that such an approach allows design modifications to be considered and implemented on a connection-by-connection basis.

In one embodiment, the chosen characteristic is a timing characteristic, the requirement is an improvement in said timing characteristic, and the method comprises the steps of: at said step (a), selecting as said one or more candidate paths one or more paths via which the bus interconnect block outputs signals to said master or slave devices; at said step (b), determining for each candidate path whether the time taken to output valid signals from the bus interconnect block exceeds a first predetermined threshold; and if so, at said step (c) inserting a storage element in that candidate path to increase the number of path portions in that candidate path. It will be appreciated that when a signal is output from the bus interconnect block to either a master or slave device, that signal will need to be safely received by the master or slave device by the end of the clock cycle in which the signal is issued. Each master or slave device will take a certain amount of time to receive a signal once that signal has been validly asserted, and accordingly this will dictate the proportion of the clock cycle that the bus interconnect block will have in order to output the valid signal. This hence provides a predetermined threshold time which can be taken to output the valid signal by the bus interconnect block, and if it is determined that that predetermined threshold time is being exceeded, then in accordance with this embodiment, a storage element is inserted in the candidate path to increase the number of path portions in that candidate path. Whilst this will result in an increase in the number of clock cycles for any particular signal to be transmitted over the connection including that candidate path, it will ensure that sufficient time is available for the bus interconnect block to output the valid signal in order to allow that valid signal to be received by the appropriate master of slave device within the clock cycle in which it is issued.

In one embodiment, the chosen characteristic is a timing characteristic, the requirement is an improvement in said timing characteristic, and the method comprises the steps of: at said step (a), selecting as said one or more candidate paths one or more paths via which the bus interconnect block receives signals from said master or slave devices; at said step (b), determining for each candidate path whether the setup time taken to receive said signals exceeds a second predetermined threshold; and if so, at said step (c) inserting a storage element in that candidate path to increase the number of path portions in that candidate path.

When signals are received from the master or slave devices, there will be a certain setup time taken by the bus interconnect block to receive the signals when they have been validly asserted by the master or slave device, and based on the duration of the clock cycle, and the time taken by the master or slave device to validly assert the signals, there will be a predetermined maximum threshold time that will be available for such setup. Accordingly, if it is determined for a particular candidate path that the setup time exceeds that predetermined threshold, then a storage element is inserted in that candidate path to increase the number of path portions in the candidate path.

In one embodiment, the chosen characteristic is a timing characteristic, the requirement is an improvement in said timing characteristic, and the method comprises the steps of: at said step (a), selecting as said one or more candidate paths one or more paths incorporating combinatorial logic; at said step (b), determining for each candidate path whether the time taken to process signals by that combinatorial logic exceeds a third predetermined threshold; and if so, at said step (c) inserting a storage element in that candidate path to increase the number of path portions in that candidate path.

Within the bus interconnect block, various combinatorial logic will typically be provided for performing some processing function on signals received by it. Within any particular clock cycle, the signal to be processed will need to be passed to that combinatorial logic, processed by it, and then output to a destination, whether that be the master or slave device, or some storage element within the bus interconnect block, and hence there will be a predetermined maximum amount of time which will be allowed for that combinatorial logic to perform its processing function. Accordingly, if it is determined at the step (b) that the time taken to process signals by that combinatorial logic exceeds that predetermined threshold time, then a storage element is inserted into the candidate path to increase the number of path portions in the candidate path.

It will be appreciated that any of the above three described approaches for selectively determining placement of storage elements within the bus interconnect block can be applied separately, or in combination with each other.

In one embodiment, the chosen characteristic is a timing characteristic, the design of the bus interconnect block includes a plurality of provisional storage elements that are candidates for removal, and the requirement is for the modification not to introduce any path portions which signals cannot traverse in a predetermined maximum time, the method comprising the steps of: specifying as the predetermined maximum time a duration of a clock cycle for the bus interconnect block; at said step (a), selecting as said one or more candidate paths one or more paths including at least one provisional storage element; at said step (b), determining for each candidate path whether removal of said at least one provisional storage element will result in a new path portion which signals can traverse in a time not exceeding the duration of the clock cycle; and if so, at said step (c) removing said at least one provisional storage element from that candidate path to reduce the number of path portions in that candidate path.

The development of the bus interconnect block will typically take place in a number of stages. Firstly, the functional operation/behaviour of the bus interconnect block will be defined, for example using a Register Transfer Language (RTL). Two popular RTLs used are VHDL and Verilog. In addition, prior to performing such RTL coding, a behavioural model may be built using a modelling language, for example SystemC, to validate at a transactional level that the design intent is correct.

Once an RTL representation of the hardware component has been developed, this is then passed through one or more synthesising and layout tools to produce a sequence of interconnected hardware elements specifying the actual design layout of the bus interconnect block. The synthesis process will typically produce a Netlist, which for example will provide a list of logic gates and a list of "nets", or interconnections. The layout stage will then be used to try and find an optimal layout of the gates and interconnections.

In the above described embodiment, provisional storage elements will be placed in the design of the bus interconnect block, typically at the RTL stage, with these provisional storage elements then being candidates for removal, with the above method being used to determine whether to perform such removal. This method might typically be performed at the layout stage. The benefit of this approach is that it is then possible to remove a provisional storage element without needing to perturb other areas of the layout design, thereby enabling the modification to be made without any significant likelihood of having knock-on adverse effects in other areas of the layout design. When determining whether removal of a provisional storage element will result in a new path portion which signals can traverse in a time not exceeding the duration of the clock cycle, the timing analysis will typically be performed on all paths around that particular storage element, i.e. paths that pass through that storage element.

It will be appreciated that if any candidate path includes more than one provisional storage element, it may not be appropriate to seek on a first iteration to remove all of the provisional storage elements in that path, but instead the determination at step (b) could be performed based on the removal of a selected subset, for example one, of the provisional storage elements in that candidate path. Further, if provided with the actual timing of signals over each path portion in the candidate path, it will be appreciated that criteria could be provided for determining which of the provisional storage elements should be included within the selected subset to be considered for removal.

As an alternative to providing a plurality of provisional storage elements, and then seeking to remove them, in an alternative embodiment the chosen characteristic is a timing characteristic, the requirement is an improvement in said timing characteristic, and the method may comprise of steps of: specifying a duration of a clock cycle for the bus interconnect block; at said step (a), selecting as said one or more candidate paths one or more paths including an unacceptable path portion which signals are unable to traverse in the duration of the clock cycle; at said step (b), applying predetermined criteria to determine for each candidate path, on the assumption that at least one storage element is inserted in the unacceptable path portion to produce a modified design, whether the timing characteristic of the modified design is improved with respect to the timing characteristic of the unmodified design; and if so, at said step (c) inserting the at least one storage element in that unacceptable path portion to increase the number of path portions in the candidate path. Again, such a method may be performed at the layout stage. In that instance, in one embodiment, the original layout will be designed with some spaces available, i.e. with some "slack," so that there will be some space available for the insertion of storage elements if execution of the method results in it being determined appropriate to insert one or more of such storage elements.

It will be appreciated that the predetermined criteria applied in order to determine whether the timing characteristic of the modified design is improved with respect to the timing characteristic of the unmodified design could take a variety of forms. For example, in one embodiment it could be determined whether the time taken for signals to traverse the longest (i.e. longest duration) unacceptable path portion in the modified design is less than the time taken for signals to traverse the longest unacceptable path portion in the unmodified design, in which event it might be considered that the timing characteristic of the modified design is improved with respect to the timing characteristic of the unmodified design. In an alternative embodiment, the step of applying predetermined criteria may comprise determining whether the number of unacceptable path portions in the modified design is less than the number of unacceptable path portions in the unmodified design, in which event it may be considered that the timing characteristic of the modified design is improved with respect to the timing characteristic of the unmodified design.

Further, it will be appreciated that some combination of criteria, for example a combination of the above two examples of criteria, could be considered when making such a determination.

As mentioned previously, in one embodiment, the steps (a) to (c) are repeated for a further selection of candidate paths, thereby allowing the design process to be an iterative one with limited impact on design decisions already made.

In the earlier described embodiment, where at the layout stage it is determined whether it is appropriate to insert storage elements in order to produce a modified design, the steps (a) to (c) may be repeated until a modified design is generated in which there are no unacceptable path portions.

In one embodiment, the chosen characteristic is power consumption, the requirement is a reduction in said power consumption, and the method comprises the steps of: at said step (a), selecting as said one or more candidate paths one or more paths via which the bus interconnect block interfaces with associated master or slave devices; at said step (b), applying predetermined criteria to determine for each candidate path whether it is appropriate to isolate the associated master or slave devices to reduce power consumption; and if so, at said step (c) inserting a storage element in that candidate path to isolate the associated master or slave devices, thereby increasing the number of path portions in that candidate path.

It will be appreciated that in certain situations, there will be a number of master or slave devices which are used less frequently than other master or slave devices, and hence for example if a particular slave device is the intended recipient for the majority of transfer requests issued by a certain master device, then it can be inefficient to also transmit those transfer requests to the other slave devices. Accordingly, in accordance with this embodiment, predetermined criteria can be applied in order to determine whether its appropriate to isolate the master or slave devices associated with a particular candidate path in order to reduce power consumption, and if so to insert a storage element in that candidate path in order to isolate the associated master or slave devices.

It will be appreciated that the predetermined criteria applied in order to determine whether it is appropriate to isolate the associated master or slave devices can take a variety of forms. However, in one embodiment, the step of applying predetermined criteria comprises determining based on a function of the number of associated master and slave devices for that candidate path and the bandwidth of the interconnect block used by those associated master or slave devices whether it is appropriate to isolate that associated master or slave device. As the number of associated master and slave devices increases, and the bandwidth used by them decreases, this increases the likelihood that the insertion of a storage element in order to isolate those associated master and slave devices will result in a significant power saving.

It will be appreciated that the storage elements may take a variety of forms. However, in one embodiment, the storage elements are register slices operable to store a group of signals received over an associated path portion.

Viewed from a second aspect, the present invention provides a computer program operable to configure a computer to perform the method in accordance with the third aspect of the present invention. Viewed from a third aspect, the present invention provides a computer program product carrying a computer program in accordance with the second aspect of the present invention.

BRIEF DESCRIPTION OF THE DRAWINGS

The present invention will be described further, by way of example only, with reference to preferred embodiments thereof as illustrated in the accompanying drawings, in which.

DESCRIPTION OF EMBODIMENTS

Figure 1A:
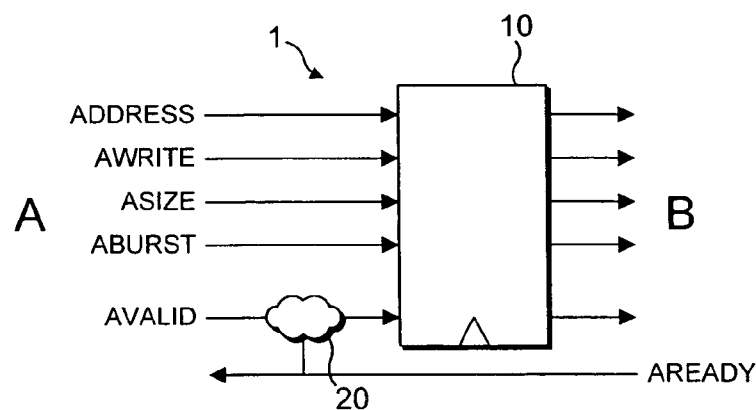
FIGS. 1A and 1B are diagrams schematically illustrating example implementations of register slices.

FIG. 1A is a block diagram schematically illustrating a register slice 1 consisting of a register slice storage 10, and some associated control logic 20. Given a channel of information, also referred to herein as a group of signals, flowing from point A to point B, a register slice 1 can be used to insert a register between a source and destination on each of the information signals within the channel. Hence, with reference to FIG. 1, it can be seen that a transfer request specifying as a group of separate signals an address, an indication that the request is a write transfer request, the size of the data, and information about the burst size, can be temporarily stored within the register slice storage 10 prior to propagation onto the destination. In addition to the above signals, a valid signal will typically be issued indicating whether the other signals should be treated as valid. This valid signal will be received by the control logic 20, which also receives a ready signal from the destination, for example a slave device, this ready signal being set to identify that that destination is ready to receive whatever signals are already stored within the register slice storage 10, and hence indicating that it is safe to write new data into the register slice storage 10. For example, during a particular clock cycle, the current contents of register slice storage 10 can be output to the destination, whilst new values are also stored into the register slice storage. Hence, in the event that the register slice storage 10 already contains data, the control logic 20 is used to prevent propagation of the valid signal to the register slice storage 10 until such time as a set ready signal is received, the register slice storage 10 being arranged only to store therein the received signals in the event that the valid signal is set. However, if the register slice storage does not contain any valid data, as will be indicated by the value of the valid signal output by the register slice storage, the control logic 20 need not wait for a set ready signal to be asserted before propagating the valid signal on to the register slice storage 10.

Figure 1B:
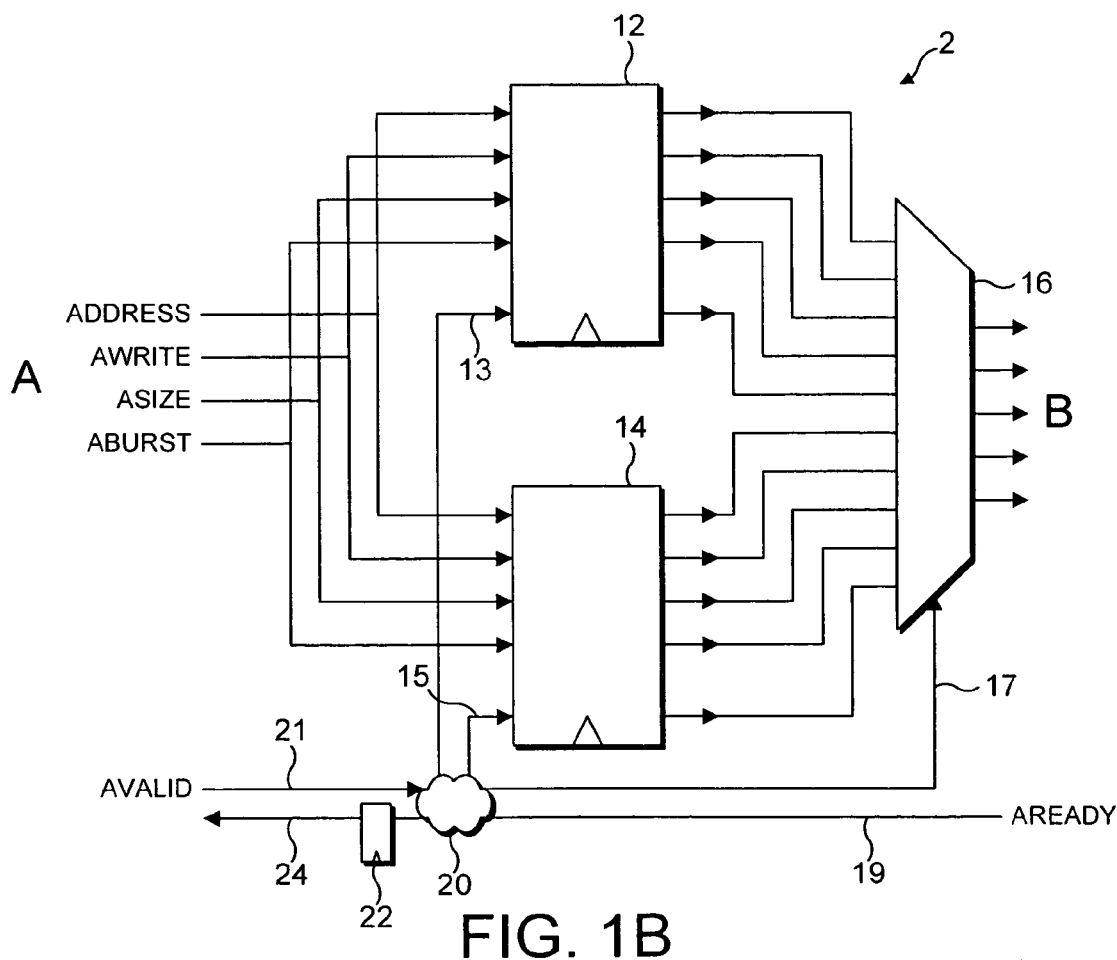

FIG. 1B shows an alternative implementation of a register slice. In this implementation, the register slice 2 has two sets of register slice storage elements 12, 14 that are included in the main path. As will be described in more detail below, this approach allows a register 22 to also be placed in the returning ready signal path without affecting the available bandwidth through the register slice.

In situations where the return path for the ready signal is too long to traverse in a single clock cycle, the register slice implementation of FIG. 1B can be used to insert a register 22 into the return path. However, with the aim of avoiding the performance penalty that would otherwise be incurred, the control logic 20 is arranged to predict the value of the ready signal (i.e. whether it will be set or not) in the next cycle and store that predicted value in the register 22. In situations where at least one of the register slice storage elements 12, 14 is empty, the control logic is arranged to predict that the ready signal in the next cycle will be set, since even if that prediction is wrong, the register slice 2 will have capacity to store in one of the two register slice storage elements 12, 14 any signals passed to it from logic acting in dependence on that predicted value. Only if both register slice storage elements currently contain valid data signals will the control logic predict that the ready signal in the next cycle will not be set, since it that instance it would not be able to receive any further input signals if the ready signal was indeed not set.

As with the FIG. 1A example, the control logic is arranged to propagate the valid signal over path 13 or 15 to a selected one of the register slice storage elements 12, 14, respectively, in dependence on the value of the received ready signal, and may for example apply a round-robin scheme where each consecutive received set of signals is sent to a different register slice storage element (e.g. first set of signals to storage element 12, second set to storage element 14, third set to storage element 12, etc). Further, the control logic 20 controls a multiplexer 16 via control path 17, so that the signals from the appropriate one of the storage elements 12, 14 are output to ensure that the output from the register slice 2 provides the signals in the same order that they were received.

It will be appreciated that the register slices 1, 2 illustrated in FIGS. 1A and 1B have the effect of increasing the number of cycles required to pass signals from point A to point B, but with the advantage that they reduce the maximum length of path portion that must be covered in a single clock cycle, hence increasing the maximum clock frequency at which the design can operate.

One particular advantage of using register slices occurs in burst-based systems, as will be illustrated with reference to FIGS. 2 and 3. Considering first FIG. 2, if the master device 30 requires a read of just one data item, then this process will take two clock cycles, namely one cycle to transmit the address over path 35 to the slave device 40, and a second clock cycle for the data to be returned over path 45. In the system illustrated in FIG. 3, where register slices are used on both the address path and the data path, this same process will take four clock cycles, one for the master device 30 to broadcast the address over path 70 to the register slice 50, a second cycle for the address to pass over path 75 to the slave device 40, a third cycle for the slave to generate the data and output it over path 80 to the register slice 60, and a fourth cycle for the data to be passed back over path 85 to the master device 30. Hence, the register slices would have to enable an increase of more than 100% in the clock frequency in order to reduce the time taken to perform such a transfer.

Figure 2:
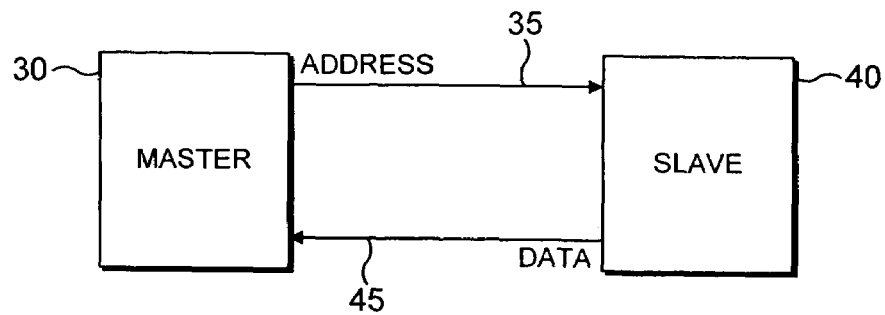
FIG. 2 illustrates an example system which does not use a register slice.
Figure 3:
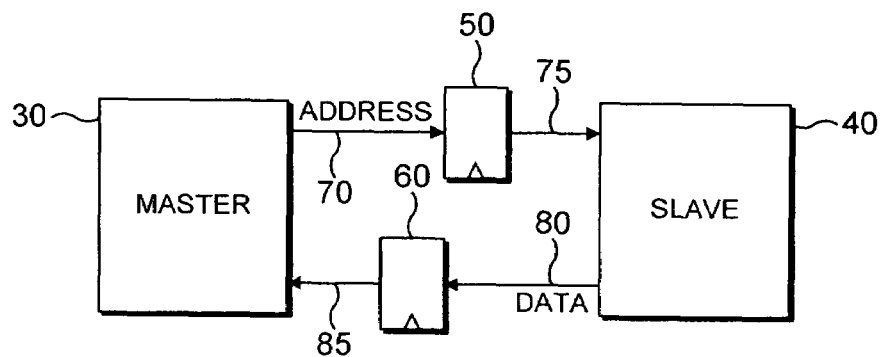
FIG. 3 illustrates an example system which does incorporate a register slice.

If, however, the transfer instead specified a burst of eight data items, then it is clear that in the system of FIG. 2 this would take a total of nine cycles, one to issue the address over path 35, and eight to receive the eight data items over path 45. In the system of FIG. 3, the same process would require 11 cycles, namely two to issue the address over paths 70 and 75, and nine cycles to receive the data over paths 80 and 85. In this scenario, the register slices only need to give an increase of greater than 22% in the clock frequency in order to reduce the time taken.

The above discussion has looked at simple point-to-point connections, which is traditionally where register slice, or pipelining, techniques have been used to date. However, not all systems employ such simple point-to-point connections.

Figure 4:
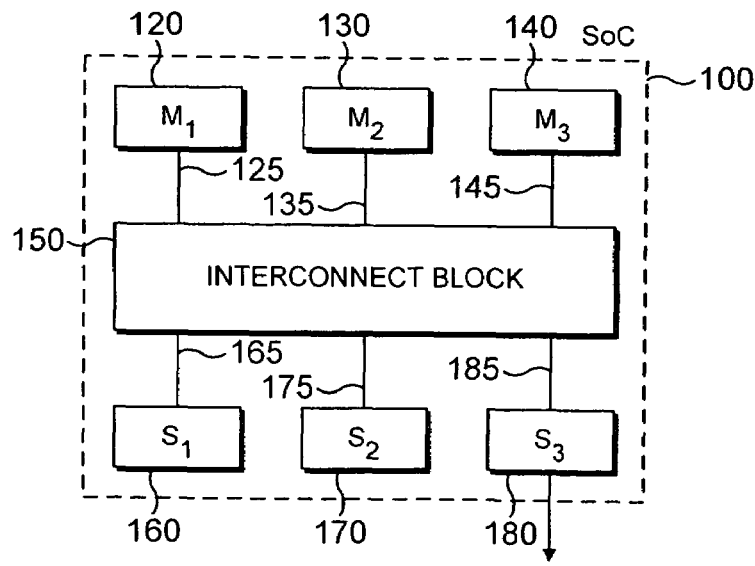
FIG. 4 is a block diagram illustrating the use of a bus interconnect block within a data processing apparatus.

For example, FIG. 4 illustrates a data processing apparatus in the form of a System-on-Chip (SoC), which may be used within a device such as a personal organiser, a mobile phone, a television set-top box, etc. The SoC design 100 has a plurality of components 120, 130, 140, 160, 170, 180 that are interconnected by an arrangement of buses. The actual interconnection of these buses is specified within an interconnect block 150. The interconnect block 150 includes a matrix of connections which provides for the interconnection of multiple bus master devices and bus slave devices within the SoC 100. Hence, each master device 120, 130, 140 may be connected to corresponding buses 125, 135, 145, respectively, whilst each slave device 160, 170, 180 may also be connected to corresponding buses 165, 175, 185, respectively, with the interconnect block 150 defining how these various buses are interconnected.

The buses interconnecting the various elements will typically operate in accordance with a specified bus protocol, and hence for example may operate in accordance with the "Advanced Microcontroller Bus Architecture" (AMBA) specification developed by ARM Limited.

Accordingly, it will be appreciated that the interconnect block 150 will describe a complex arrangement of interconnections between various master and slave devices. This complex arrangement may include a number of unidirectional channels of information. In accordance with one embodiment which will now be discussed with reference to FIG. 5, a methodology and tool are provided which provide for the selective placement of register slices within the bus interconnect block in order to seek to meet a requirement for a chosen characteristic of the bus interconnect block, such as an improvement in a timing characteristic, a reduction in a power consumption characteristic, etc.

Figure 5:
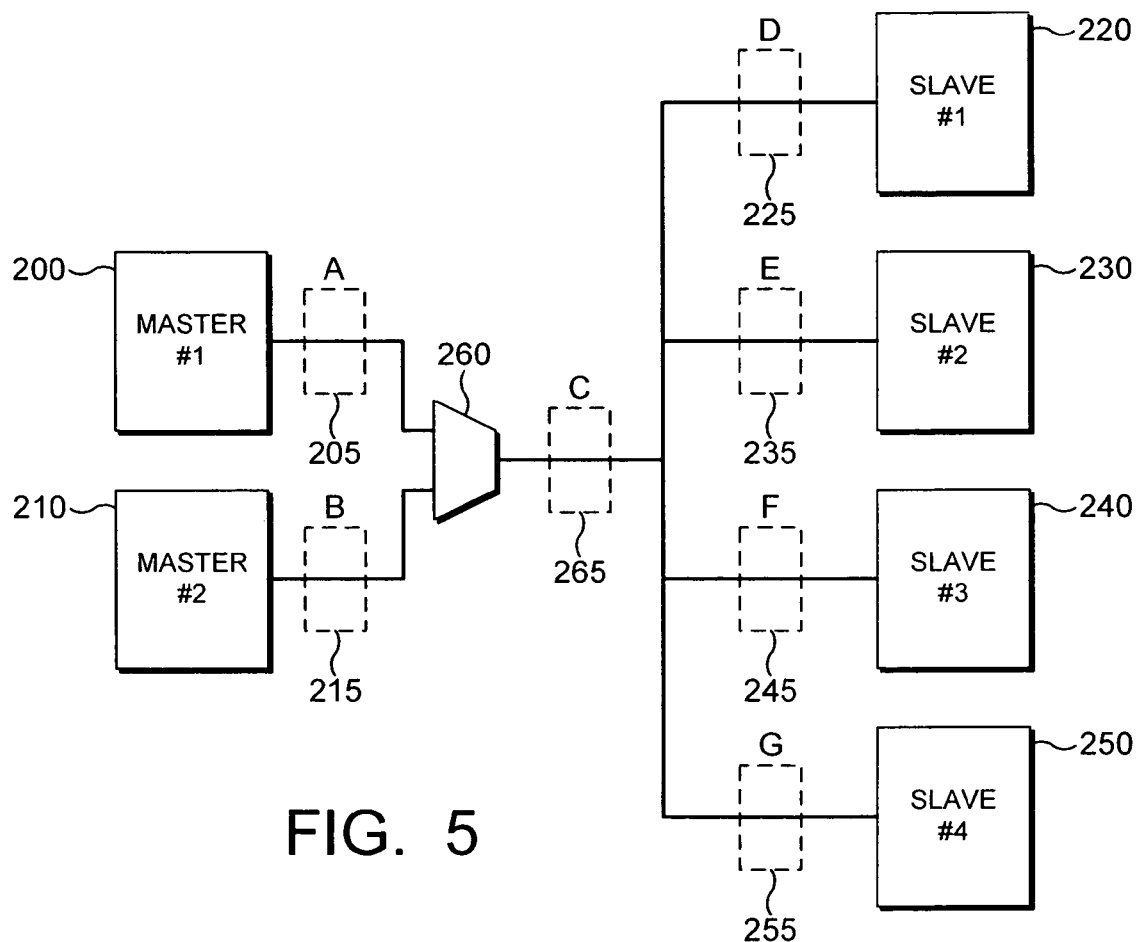
FIG. 5 is a block diagram illustrating the possible uses of register slices within a bus interconnect block in accordance with one embodiment.

FIG. 5 illustrates a two master and four slave system with a bus interconnect block located therebetween. The bus interconnect block of FIG. 5 has been kept simple to ease illustration, but it will be appreciated that in typical embodiments the bus interconnect block will be significantly more complex than the arrangement shown in FIG. 5. As can be seen from FIG. 5, a number of paths are provided by the bus interconnect block to enable the master 1 200 or master 2 210 to communicate with any of the four slave devices 220, 230, 240, 250. When transfer requests are issued by the master devices, an arbiter will typically be used in order to determine which master should be granted access to the slave devices, and that arbiter will then send a control signal to the multiplexer 260 to control which transfer request is output to the slave devices. For clarity, only the address path is shown in FIG. 5, but it will be appreciated that data paths will also be provided in both directions between the master and slave devices.

The boxes with dashed outlines 205, 215, 225, 235, 245, 255 and 265 show a number of potential sites for a register slice. It can be seen that the site 265 is a common site, as it intercepts the path between all master and slave devices. A register slice in this location would effectively place the combinatorial delays of the bus level multiplexer 260 behind a register. In one embodiment, a process is performed in order to identify potential sites such as the site 265, and determine whether it is appropriate to add a register slice at those sites, the method involving selecting as one or more candidate paths those paths incorporating combinatorial logic, such as the path passing through multiplexer 260. It will be appreciated that such a candidate path may form the entirety of a connection between a master and a particular slave, or may be a part of that connection.

Once a candidate path has been selected, it is determined whether the time taken to process signals by the combinatorial logic exceeds a predetermined threshold. It will be appreciated that in a particular clock cycle, the signals to be processed by the combinatorial logic will need to be transmitted from some storage element to the combinatorial logic, processed by the combinatorial logic, and then the output signal transmitted to another storage element. Hence, it is clear that the combinatorial logic will only have some portion of the clock cycle period available for performing the necessary processing functions, and accordingly a determination can be made as to whether the time taken to process signals by that combinatorial logic exceeds, or is likely to exceed, the time available. If so, the process is arranged to insert a storage element in that candidate path in order to increase the number of path portions in that candidate path. This processing may be performed at any appropriate stage during the design process, for example at the RTL definition stage.

The use of register slices at other locations within the bus interconnect block can also assist in improving timing characteristics. For example, a process can be performed to select as a candidate path a path via which the bus interconnect block receives signals from master or slave devices, for example the path between master 2 210 and any storage element provided within the interconnect block. Then, it can be determined whether the setup time taken to receive the signals exceeds a predetermined threshold. It will be appreciated that a certain amount of the clock cycle will be required in order for the master or slave device to validly assert the signals, this leaving only a portion of the clock period available for use in receiving the signals by the bus interconnect block. If the setup time taken to receive the signals exceeds that available time, then the process can be arranged to insert a register slice in the candidate path, and hence for example may decide to introduce a register slice at the site 215. A register slice at location 215 would hide any large output delays from master 2 210.

Additionally, the process may be arranged to select as a candidate path a path via which the bus interconnect block outputs signals to master or slave devices, for example a path between slave device 4 250 and some internal storage element within the bus interconnect block. Then, the process can be arranged to determine for that candidate path whether the time taken to output valid signals from the bus interconnect block exceeds a predetermined threshold. It will be appreciated that only a certain portion of the clock period will be available to the interconnect block for it to validly assert output signals, in order to leave sufficient time for the recipient device to then validly receive those signals. Accordingly, if it is determined that the time taken to output valid signals exceeds that allowable time, the process can be arranged to insert a register slice in that candidate path to increase the number of path portions in that candidate path. Hence, as an example, the process may decide to insert a register slice at site 255, in order to hide large input setup requirements of slave device 4 250.

The advantage of locating register slices local to the interfaces with particular master or slave devices is that it does not impact on the number of cycles required for all accesses. For example, if a register slice is positioned at site 215 in association with master device 2 210, this will have no impact on the number of cycles required by master device 1 200 to access any of the slave devices 220, 230, 240 or 250. Furthermore, if master device 1 200 is responsible for the majority of the bus traffic, say for example 90%, then a register slice at site 215 will only need to provide an increase of greater than 10% in the overall system clock frequency to benefit the overall rate at which addresses can be issued.

It will be appreciated that any combination of register slices may be deemed appropriate in accordance with the above described techniques, and hence for example register slices may be located at sites 205, 265, 235 and 255.

Examples of when individual master or slave devices may benefit from the use of a register slice within the interconnect block are as follows:
1. When the design of the master or slave component includes combinatorial logic on either input or output paths;
2. When the master or slave device is physically located a long distance from other components on the bus;
3. When the master or slave device is operating in a different power domain and requires voltage level shifters between the device and the rest of the system;
4. When the master or slave device is supplied as a "hardened" component with fixed output drive capabilities; and
5. When the master or slave component is located on a different branch of the clock tree and an imbalance in the clock distribution effectively increases the output valid or input setup time of that component.

A further extension of the concept of the use of register slices within the bus interconnect block is to perform layout stage optimisation of the register slices. In one embodiment, this is achieved by including within the initial design a number of provisional register slices which are then candidates for removal during the layout stage of the design, these register slices being removable if it is determined that their removal does not prevent the system clock frequency from reaching the required speed.

Figure 6:
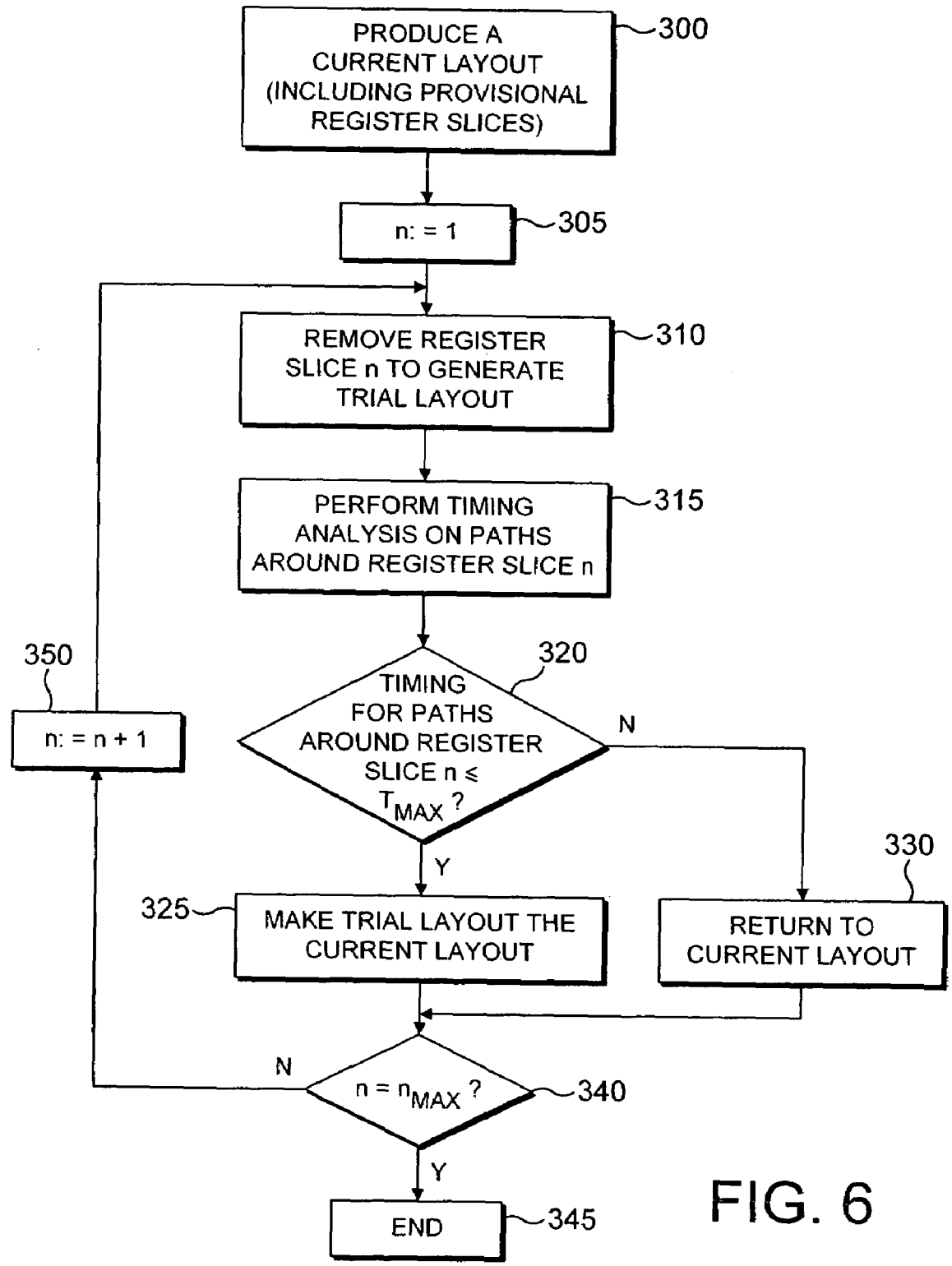
FIG. 6 is a flow diagram illustrating a technique used to remove provisional register slices in accordance with one embodiment.

FIG. 6 illustrates a process that can be performed at the layout stage, and which for example could be executed by the layout tool.

At step 300, a current layout is produced using the layout tool, and including the provisional register slices included at an earlier stage of the design process, for example at the RTL stage. If $n_{MAX}$ represents the total number of such provisional register slices to be considered for removal, then each provisional register slice is given an associated number from 1 to $n_{MAX}$. It will be appreciated that this number $n_{MAX}$ may comprise the entirety of the provisional register slices, or may be some subset of them. At step 305 n is set equal to 1, whereafter the process proceeds to step 310, where register slice n is removed in order to generate a trial layout.

Then at step 315 timing analysis is performed on the paths around register slice n in order to determine for each new path portion resulting from the removal of register slice n whether signals can be propagated through the path portion in a time less than or equal to the clock cycle period, this clock cycle period being referred to herein as $T_{MAX}$. It will be appreciated that there are a number of known techniques for performing timing analysis on path portions, and typically such a process will involve calculating the gate delays and wire delays over each identified path portion to determine the time taken for signals to be transferred over the corresponding path portion.

Thereafter, at step 320, it is determined whether the timing for those paths around register slice n are all less than or equal to $T_{MAX}$, and if so the trial layout is adopted as the new current layout at step 325. Otherwise, the process branches to step 330, where the trial layout is discarded and instead the existing current layout is used.

The process then proceeds from either block 325 or block 330 to block 340, where it is determined whether n is equal to $n_{MAX}$, if so this indicating that all provisional register slices have been considered for removal, and accordingly the process ends at step 345. However, if n does not equal $n_{MAX}$, then n is incremented by 1 at step 350, whereafter the process returns to step 310 to consider removal of the next register slice.

It will be appreciated that the way in which each of the provisional register slices are numbered between 1 and $n_{MAX}$ may be arranged in a variety of ways, and may for example be arranged such that the provisional register slices which are most likely to be removable (e.g. based on the timing information of the various existing path portions) are considered first. Alternatively, it may be decided to number the register slices such that those associated with high bandwidth masters are considered for removal first.

Figure 7A:
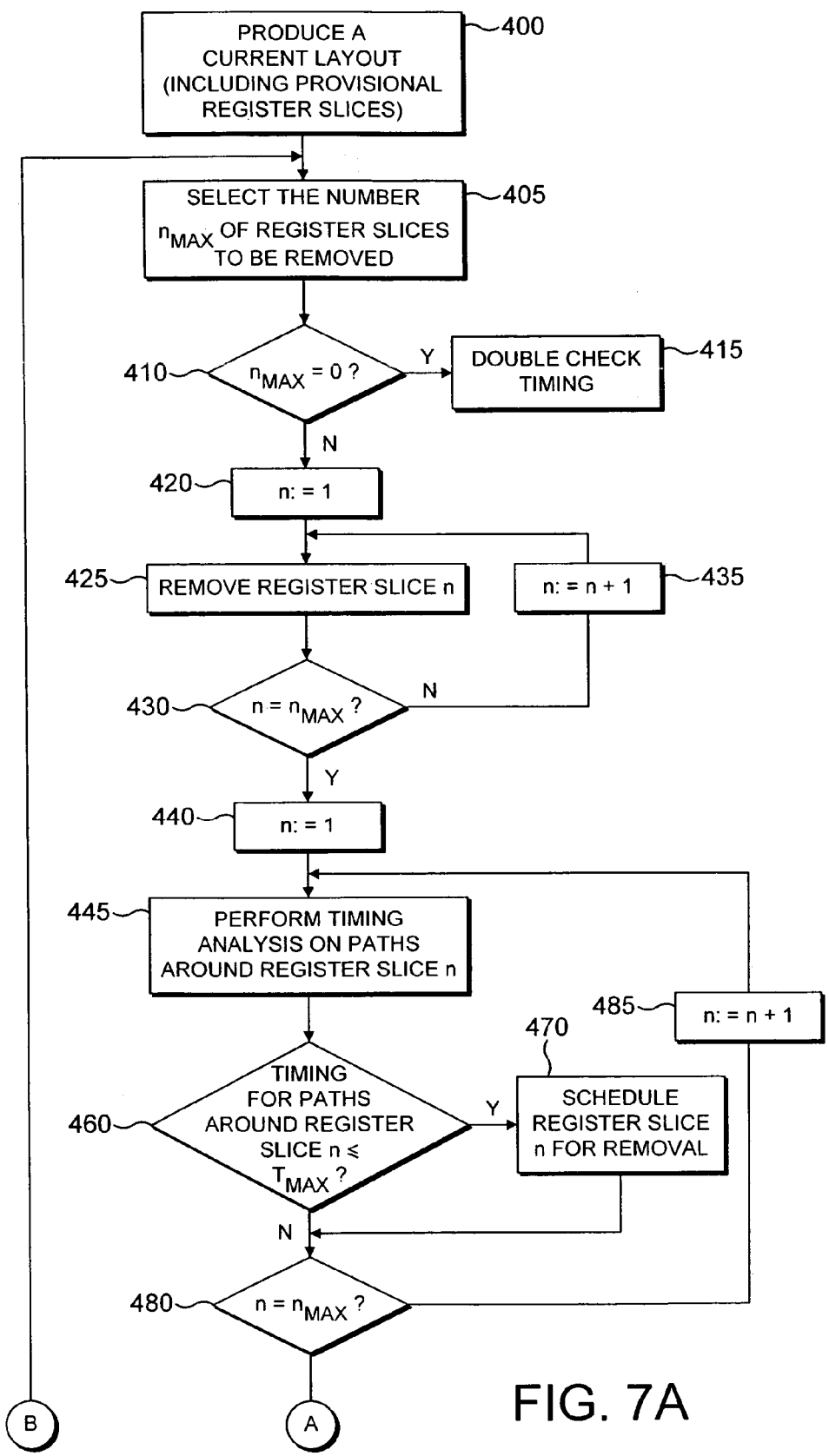
FIGS. 7A and 7B are flow diagrams illustrating a process performed in order to remove provisional register slices in accordance with another embodiment.
Figure 7B:
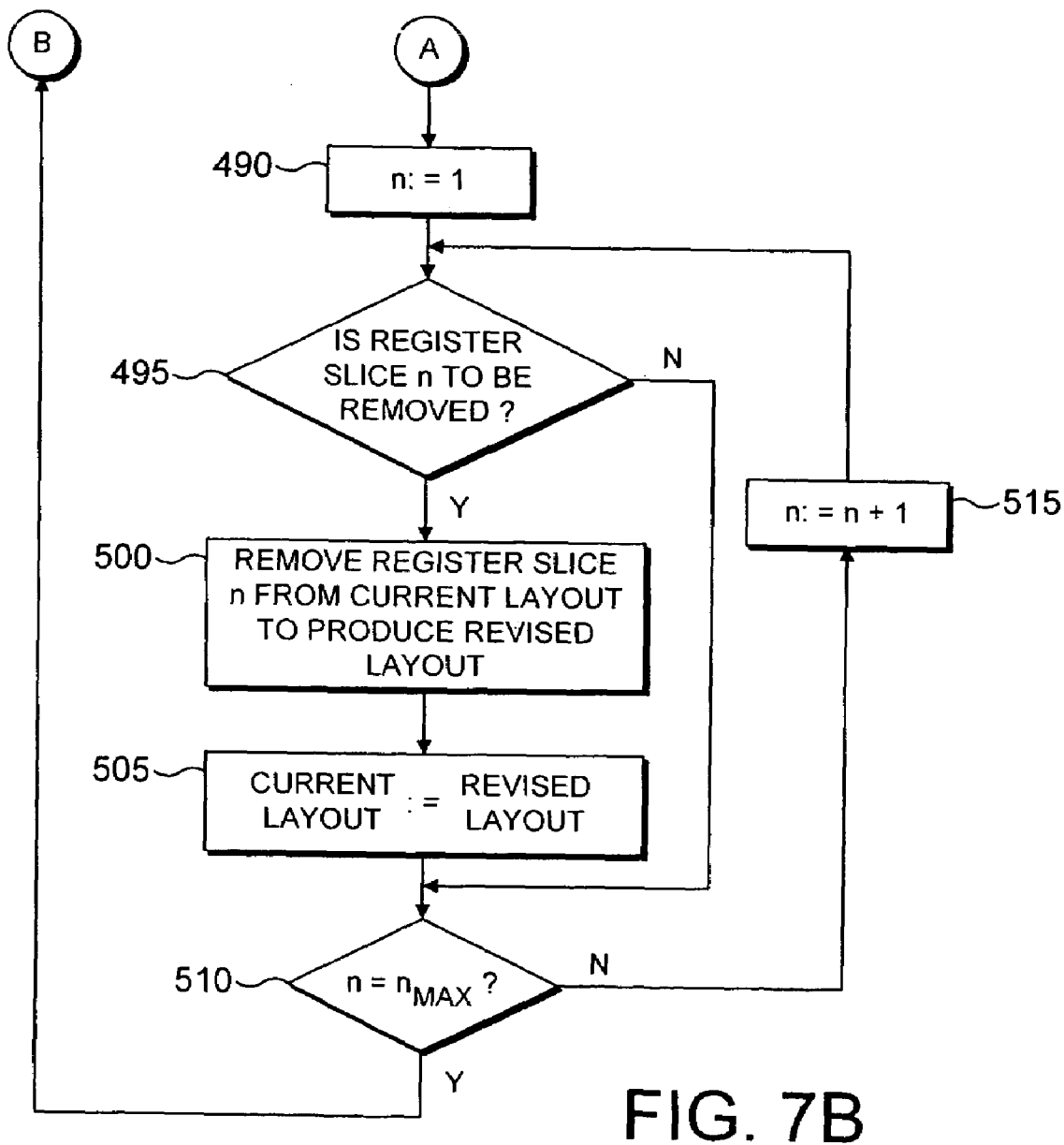

FIGS. 7A and 7B illustrate an alternative process for performing the removal of such provisional register slices, where a number of steps are taken in parallel. More particularly, at step 400 the current layout is produced, including the provisional register slices, whereafter at step 405 a number $n_{MAX}$ of register slices to be considered for removal is selected. It will be appreciated that this number $n_{MAX}$ may comprise the entirety of the provisional register slices, or may be some subset of them. For example, some candidate paths may have a plurality of provisional register slices provided along them to divide the candidate path into multiple path portions, and it may not be appropriate to consider removing all of those provisional register slices during the same iteration of the process.

It will also be appreciated from the following description of FIGS. 7A and 7B that this embodiment is intended to be an iterative process, and so the choice of $n_{MAX}$ is likely to be different to the choice of $n_{MAX}$ made in the FIG. 6 embodiment. In the FIG. 6 embodiment, it was envisaged that each provisional register slice in the design is given a unique number, and $n_{MAX}$ was then chosen to be equal to the total number of provisional register slices being considered for removal. However, In FIGS. 7A and 7B, groups of the provisional register slices can be considered in different iterations of the process, and hence in any particular iteration $n_{MAX}$ will be chosen to be the total number of provisional register slices being considered for removal in that particular iteration. Further, the numbers allocated to provisional register slices will not be unique, but instead on each iteration the register slices being considered in that iteration will be allocated numbers from 1 to $n_{MAX}$. It will however be appreciated that in an alternative embodiment, unique numbers could still be allocated to all of the provisional register slices, and on each iteration there will be both an $n_{MIN}$ and an $n_{MAX}$ value, so that a particular group of the register slices is considered on each iteration.

Once the number $n_{MAX}$ of register slices has been selected at step 405, a test is performed at step 410 to determine whether $n_{MAX}$ is equal to zero. This will not typically be the case during the first iteration through the process of FIGS. 7A and 7B, but will ultimately be the case once in some subsequent iteration it is decided at step 405 that there are no further provisional register slices which could realistically be removed. If $n_{MAX}$ is determined to be zero at step 410, then the process proceeds to step 415, where a final double check on the timing of the paths of the bus interconnect block is performed, in order to ensure that there are no path portions where signals are unable to traverse the path portion within a single clock cycle. This should not be the case, since at the outset signals could traverse all path portions without exceeding the clock cycle period, and each time a register slice is removed using the process of FIGS. 7A and 7B, a check is performed on the affected path portions. The other path portions in the design will not typically be affected, since the removal of a register slice will not involve any modification to the layout of the remaining design. However, by performing a double check at step 415, any timing issues that have appeared can be identified.

Assuming $n_{MAX}$ does not equal zero, the process proceeds to step 420, where n is set equal to one, whereafter at step 425 register slice n is removed from the design.

Thereafter at step 430, it is determined whether n equals $n_{MAX}$, and if not n is incremented by one at step 435, whereafter the next register slice n is removed at step 425.

When it is determined at step 430 that n does equal $n_{MAX}$, then the process proceeds to step 440, where n is again set equal to one, whereafter at step 445 timing analysis is performed on the paths around register slice n. This process is analogous to the process 315 described earlier with reference to FIG. 6. Thereafter the process proceeds to step 460, where it is determined whether the timing for the paths around register slice n were less than or equal to $T_{MAX}$, i.e. whether signals could traverse all affected path portions in a single clock cycle. This process is analogous to the process 320 described earlier with reference to FIG. 6. Assuming it is determined that all of the new timings are less than $T_{MAX}$, then the process proceeds to step 470 where register slice n is scheduled for removal. The process then proceeds to step 480, or directly from step 460 to 480 in the event that it is determined that not all of the affected path portions have a timing less than $T_{MAX}$, and at step 480 it is determined whether n equals $n_{MAX}$. If not, then n is incremented by one at step 485, whereafter the process returns to step 445.

When it is determined that n does equal $n_{MAX}$, then the process proceeds to step 490, where n is again set equal to one, whereafter it is determined at step 495 whether register slice n needs to be removed, this being indicated by the information stored at the scheduling step 470. If the register slice n is to be removed, then that register slice is removed at step 500 to produce a revised layout, after which the revised layout becomes the new current layout at step 505. The process then proceeds to step 510, or proceeds directly to step 510 from step 495 in the event that register slice n is determined not to be removed. At step 510, it is determined whether n equals $n_{MAX}$, and if not, n is incremented by one at step 515, after which the process returns to step 495. When at step 510 it is determined that n does equal $n_{MAX}$, then the process returns to step 405, where a selection of any remaining provisional register slices for consideration in another iteration of the process is made. As mentioned earlier, at some iteration it will be determined that $n_{MAX}$ for the next iteration is zero, which will cause the process to end with a double check of the timing of the bus interconnect block at step 415.

Figure 8:
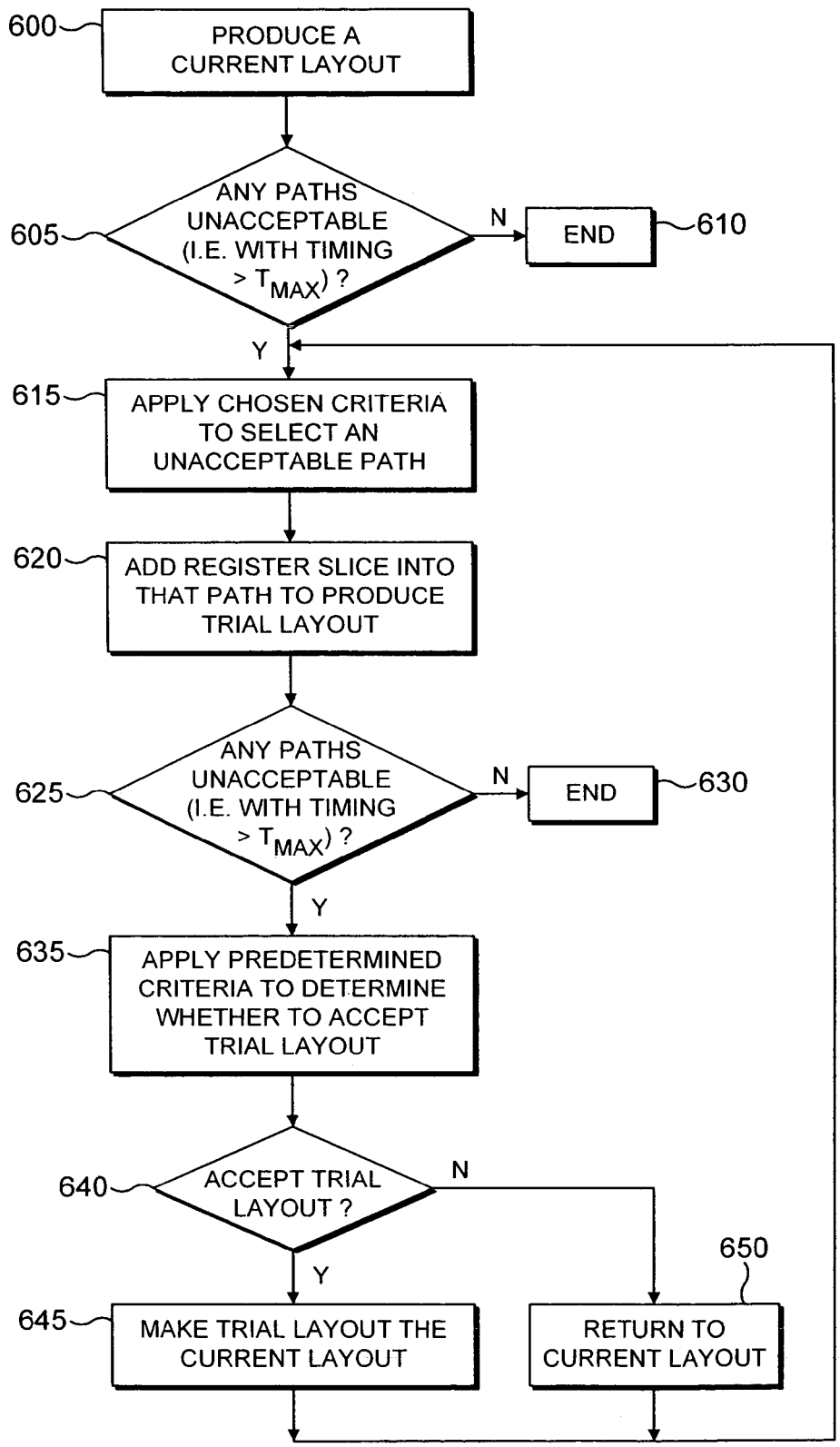
FIG. 8 is a flow diagram illustrating a technique employed in order to determine whether it is appropriate to insert register slices in particular paths in accordance with one embodiment.

The above described approaches of removing provisional register slices already provided within the design is beneficial, because it enables register slices to be removed without needing to perturb other areas of the design, and hence the result is simply a less optimal layout with spaces. In addition, the approach of removing register slices also allows the up-front analysis of the system performance to be done assuming a worst case model for the interconnect performance, and any removal of register slices can be done safe in the knowledge that this should only result in an improvement in overall system performance characteristics. However, as an alternative to adding provisional register slices into the design, and then seeking to remove them during the layout stage, it is also possible to perform a process at the layout stage to determine whether to introduce new register slices. Such a process is described by way of example with reference to the flow diagram of FIG. 8.

At step 600, a current layout is produced based on the current design. Then, at step 605, it is determined whether any of the paths are unacceptable, i.e. whether any of the paths include path portions where the time taken for signals to traverse those path portions is greater than the clock cycle period $T_{MAX}$. If not, no corrective action is required, and the process ends at step 610. However, assuming that there are some unacceptable paths, the process proceeds to step 615, where chosen criteria are applied to select an unacceptable path. It will be appreciated that there are a number of ways in which this could be done. For example, the unacceptable path whose timing is the longest, i.e. the most unacceptable, could be selected, or alternatively the selection could be made at random.

Thereafter, the process proceeds to step 620, where a register slice is added into the path to produce a trial layout, after which timing analysis is performed at step 625 to determine whether there are any paths within the interconnect block that are still unacceptable. Clearly the addition of a register slice into the unacceptable path selected at step 615 will improve the timing characteristic of that path, although it may still be an unacceptable path. Further, there may well be other unacceptable paths still in the system, and indeed it is possible that the introduction of such a register slice, with any accompanying movement in the layout design, may have a knock-on adverse effect on some paths' timings. If it is determined at step 625 that there are no unacceptable paths remaining in the interconnect block, then the process ends at 630, but otherwise the process proceeds to step 635 where predetermined criteria is applied to determine whether to accept the trial layout in preference to the current layout. It will be appreciated that a number of criteria could be used to make this decision. For example it may be decided to accept the trial layout if the longest unacceptable path (i.e. that with the longest timing) in the trial layout has a timing which is less than the longest unacceptable path in the current layout. Alternatively, or in addition, consideration could be given to the total number of unacceptable paths in the trial layout as compared with the total number of unacceptable paths in the current layout. It will be appreciated that various other criteria could be taken into account when determining whether the trial layout provides improved timing characteristics compared with the current layout.

Following the application of the predetermined criteria at step 635, it is then determined at step 640 whether to accept the trial layout based on the determination resulting from the application of the predetermined criteria. If the trial layout is to be accepted, the process proceeds to step 645, where the trial layout becomes the new current layout, whereafter the process returns to step 615 to cause a further unacceptable path to be selected. If at step 640 it is decided that the trial layout is not to be accepted, then the process branches to step 650 where the trial layout is discarded, and instead the previous current layout is used, whereafter the process proceeds to step 615 to cause a different unacceptable path to be selected. It will be appreciated that the chosen criteria applied at step 615 will typically keep track of previous unacceptable paths selected but considered not to produce an improvement in timing characteristics of the overall bus interconnect block.

When adding register slices into the design, it will be appreciated that the layout will typically have to be modified to provide room for the insertion of the register slices, and accordingly there is a greater chance that the insertion of a register slice will have knock-on effects in other areas of the design then there was using the alternative approach of FIGS. 6 and 7, where register slices were selectively removed. Nevertheless, it will be appreciated that both approaches could be used in any particular implementation. For example, the approach of providing provisional register slices in the design, and then selectively removing them could be used as the basic process, with the process of FIG. 8 then being used to selectively insert any further register slices that are then deemed necessary to meet the required timing characteristics.

Figure 9:
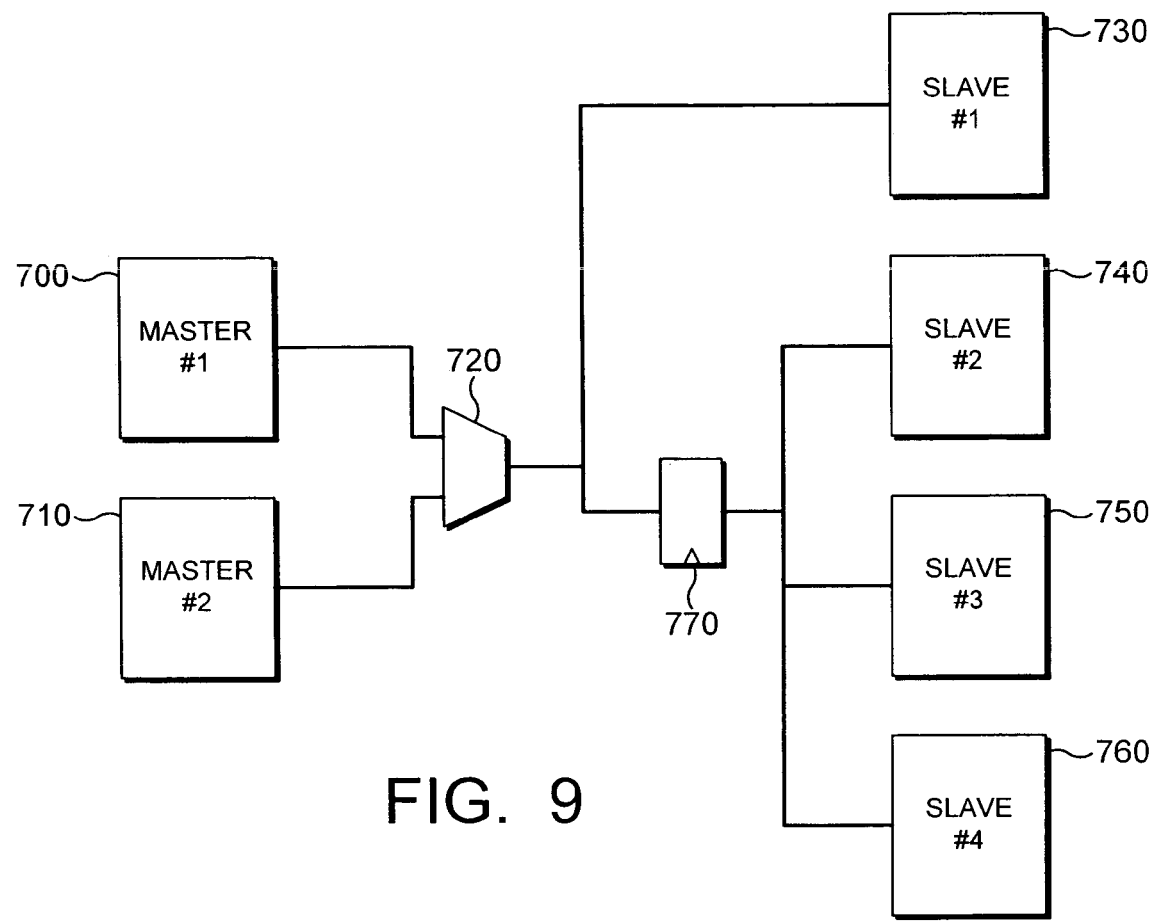
FIG. 9 is a block diagram schematically illustrating the use of a register slice within a bus interconnect block in accordance with one embodiment in order to reduce power consumption.

Another possible use of register slices within a bus interconnect block is to provide isolation of a number of master or slave components within the system. This possibility will be discussed further with reference to FIG. 9, which illustrates two master devices 700, 710 interconnected with four slave devices 730, 740, 750, 760, with a multiplexer 720 being used to control which master device is given access to the slave devices at any point in time. Again, for clarity, only the address paths are shown in FIG. 9. A process can be performed in order to seek to improve power consumption, the process involving selecting as a candidate path a path via which the bus interconnect block interfaces with master or slave devices. Predetermined criteria can then be applied to determine whether it is appropriate to isolate the associated master or slave devices from other components through the provision of a register slice within that candidate path. It will be appreciated that a number of criteria could be used in this step. Typically, a greater saving in power consumption will be achieved the larger the number of master or slave devices connected to that path, and the lower the bandwidth of the interconnect block used by those master or slave devices.

As an example, if considering the system of FIG. 9 it is known that a large proportion of the system bandwidth is to slave device 1 730, then it may be considered beneficial to insert a register slice 770 into the path provided to slave devices 740, 750 and 760. When a transfer request is then initiated from a master device, that transfer request will then be routed via the multiplexer 720 to both slave device 1 730 and to register slice 770. Some initial address decoding will be performed by a decoder within the bus interconnect block, to determine whether that request is destined to slave device 1, or to one of slave devices 2, 3 and 4. Only if the access request is destined for one of slave devices 2, 3 or 4 will the register slice 770 receive an address valid signal causing it to store the received signals within the register slice. Hence, whereas without the register slice the transfer request would have been propagated to all four slave devices with only one of the slave devices receiving an address valid signal, the provision of the register slice 770 has significantly reduced the power consumption by avoiding any accesses to slave devices 2, 3 or 4 unless one of those slave devices is the intended recipient for the access request. It will be appreciated that the trade-off of this benefit is that more clock cycles are required to access the isolated slave devices 2, 3 or 4, but assuming these slave devices are accessed relatively infrequently, the power saving benefit may warrant the provision of the register slice 770.

All of the embodiments discussed so far have related to techniques for determining at design-time whether or not to include a register slice within the design. Whilst such techniques can assist in producing a design having regard to a worst case set of operating characteristics (e.g. operating conditions, operating environments, etc) that is envisaged, each piece of apparatus produced in accordance with that design may be subject to different operating conditions and be located in different operating environments, which can result in the apparatus operating sub-optimally. For example, in any particular implementation, the apparatus may operate at a clock speed lower than the target clock speed considered during design, may use different voltage levels to those considered during design, etc. Further, manufacturing tolerances will result in differences between individual pieces of apparatus produced in accordance with the design, which will cause variations in operational characteristics, as indeed will the operating environment of each apparatus.

Figure 10:
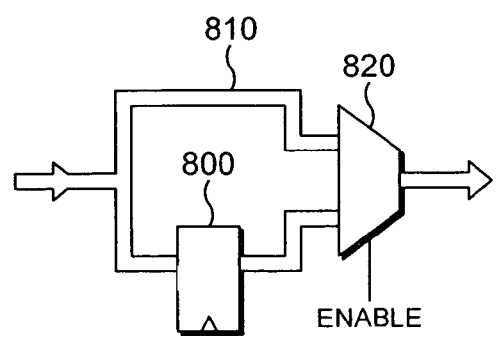
FIG. 10 is a diagram schematically illustrating an implementation of a selectable register slice in accordance with one embodiment.

In order to allow the data processing apparatus to adapt to such different operating conditions and operational characteristics, in one embodiment the data processing apparatus includes one or more selectable register slices as illustrated in FIG. 10. As can be seen from FIG. 10, each such selectable register slice 800 has associated therewith a bypass path 810, with a multiplexer 820 being provided to enable selection of either the path through the register slice 800, or the bypass path 810. The multiplexer 820 is driven by an enable signal provided from a controller, with the controller controlling the selection of either the selectable register slice 800 or its associated bypass path 810 based on setup information, thereby allowing a dynamic run-time decision as to whether the register slice 800 should be used.

By bypassing the register slice 800, the number of clock cycles taken for a signal to traverse a particular connection can be reduced, but this will require a signal to travel further within a particular clock cycle. In one mode of operation, it is envisaged that the data processing apparatus would default, for example after reset, to using each selectable register slice, as this will ensure that the data processing apparatus will operate functionally in all conditions, and then the data processing apparatus is arranged under the control of the controller to switch to the bypass mode of operation, where the selectable register slices 800 are selectably bypassed, once it is determined that the operating conditions will allow the bypass mode to be used.

Figure 11:
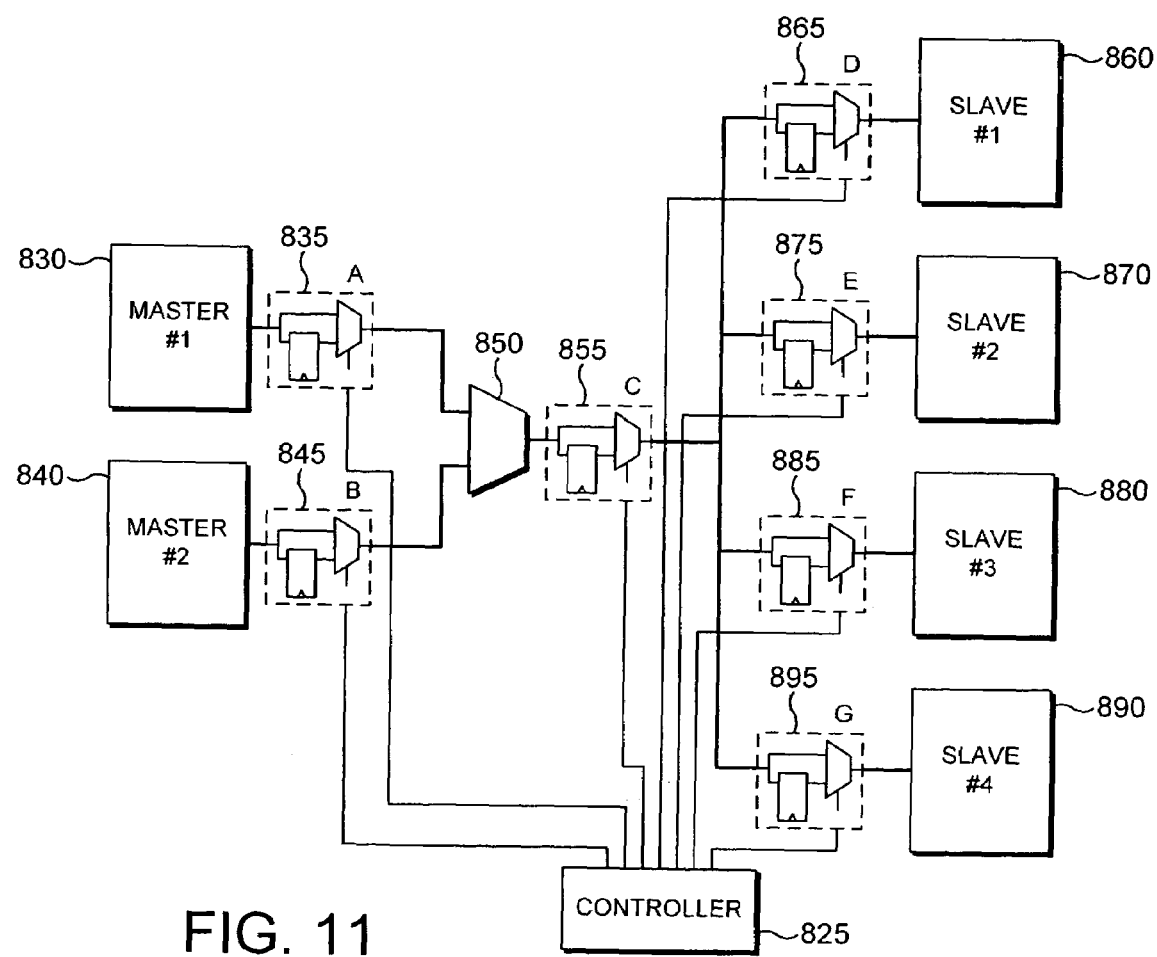
FIG. 11 is a block diagram illustrating one embodiment of a bus interconnect block in which selectable register slices are employed.

FIG. 11 illustrates an example implementation of the selectable register slice technique in a situation where the data processing apparatus is a bus interconnect block. As shown in FIG. 11, two master devices 830, 840 are interconnected via the bus interconnect block with four slave devices 860, 870, 880, 890, respectively. The basic structure is the same as that described earlier with reference to FIG. 5, and like in FIG. 5, for clarity only the address path is shown. However, in this example, selectable register slices 835, 845, 855, 865, 875, 885 and 895 are incorporated within the bus interconnect block associated with the interfaces to each master and slave device, and with the output from multiplexer 850. A controller 825 is provided for generating the required control signals to the multiplexers forming part of each selectable register slice.

With all of the selectable register slices being used, it can be seen from FIG. 11 that it will take four clock cycles for a signal to be propagated from a master device to a slave device. However, if as an example it is determined that based on the setup information used by the controller, the register slice 885 associated with slave device 880 can be bypassed, this will reduce by one cycle the time taken for any accesses to slave device 880. Similarly, if the setup information indicates that the register slice 835 associated with master device 830 can be bypassed, this will reduce by one cycle the time taken to transmit to the slave device a transfer request from that master device. Further, it can be seen that if the setup information indicates that the register slice 855 can be bypassed, this will reduce by one cycle the time taken to transmit any transfer requests from master devices to slave devices.

In addition to the address paths shown in FIG. 11, it will be appreciated that data paths will also be provided in both directions between the master and slave devices, and selectable register slices such as those discussed above could also be inserted into the data paths to allow the number of path portions in particular connections from master to slave devices, or from slave to master devices, to be changed.

Accordingly, it can be seen that such a design allows a great deal of flexibility to be exercised post-production of the apparatus in order to seek to improve the efficiency of operation of the data processing apparatus having regard to its actual operating conditions.

There are a number of different approaches that can be adopted with regards to the control of the register slices by the controller 825. In a first embodiment, boot time register slice configuration can be performed by the controller using predetermined setup information. In this embodiment, the data processing apparatus, in the FIG. 11 example the bus interconnect block, is configured at boot time, such that it only includes the register slices that are required having regard to the particular implementation in which that apparatus is utilised. The predetermined setup information will typically have been determined for different implementations, for example within a laboratory characterisation environment. Hence, considering the FIG. 11 example, if the bus interconnect block is used within a system provided within a mobile phone, and hence is to be run at a relatively low clock speed or a relatively low power, then predetermined setup information can be provided for that implementation, which the controller can then use at boot time to determine the appropriate register slices to select, and which ones to bypass. Alternatively, if the same bus interconnect block is to be used within a system implemented within a computer operating at higher clock speed and/or higher power, then a different set of predetermined setup information can be referenced by the controller at boot time in order to determine the appropriate selection of register slices.

In a second embodiment, register slice configuration can again be performed at boot time, but with a dynamic test being performed in order to determine the appropriate set up information. With this approach, the boot sequence may include a test process executed in order to determine which paths require the use of a register slice. The test process will typically involve the performance of a timing test for a variety of signals passed over paths which could be affected by the inclusion or omission of the selectable register slice. As an example, considering FIG. 11, the test process would typically involve adopting a number of different selection configurations of the various selectable register slices (e.g. all register slices selected, some selected, some bypassed, or all bypassed, etc), and for each selection configuration, sending a variety of signals over the paths that may be affected by the bypassing of a particular register slice, to detect whether those signals can safely traverse the affected path portion within a single clock cycle. Each selection configuration effectively defines a unique design of the data processing apparatus, and the performance of timing tests in connection with particular designs will be well understood by those skilled in the art, and hence will not be discussed in any more detail herein. It will be appreciated that any selectable register slice can only be bypassed if the timing test confirms that the test signals will all be able to traverse within a single clock cycle the extended path portion resulting from the bypass of that register slice.

The benefit of using the dynamic test approach is that it allows each device to adapt to its operating environment. However, one potential disadvantage is that even a small change in operating characteristics, such as temperature of operation or supply voltage, may cause a functional failure. However, the likelihood of this occurring can be alleviated by taking such variations into account when performing the test procedure. For example, if the data processing apparatus is to operate at a particular clock speed, then when performing the test process a slightly elevated clock speed may be used, so that when a particular configuration of register slices that passed the test process is selected, there will be confidence that fluctuation resulting from minor changes in operational characteristics, such as due to temperature changes, will not cause a functional failure.

It will be appreciated that boot time configuration may be applicable in a number of different cases, for example where uncertainty exists in the pre-manufacture timing characteristics of the data processing apparatus, or where uncertainty exists in the signal integrity characteristics of the data processing apparatus.

In a third embodiment, predetermined setup information can be used as discussed earlier with reference to the first embodiment, but configuration can be performed dynamically as operating conditions change. For example, different predetermined setups can be defined for different clock speeds, different supply voltages, etc. Then, if during operation a change in operating conditions is to occur, for example as may occur when changing from a normal mode of operation to a standby mode of operation, then the controller can be invoked dynamically to apply the predetermined setup information appropriate for the new operating condition in order to select only those selectable register slices appropriate for the new operating condition. This process is illustrated schematically by the flow diagram of FIG. 12, which illustrates an example where the change in operating condition involves a change in clock speed.

At step 900, it is determined whether a change in clock speed is required, and if so the process proceeds to step 905, where it is determined whether the clock speed is increasing or decreasing. If the clock speed is increasing, the process proceeds to step 910, where the register slice controller 825 is programmed with new values appropriate for the new clock speed, these new values being derived from the predetermined setup information appropriate for the new clock speed. This will cause the controller to output a revised set of enable signals to the various selectable register slices to cause each register slice to be selected or bypassed dependent on those values. Thereafter, at step 915, the clock speed is changed to the new clock speed.

When the clock speed is increasing, it is clearly appropriate for the register slice selection to take place prior to the change in clock speed, as otherwise a functional failure could occur in the interim. However, if the clock speed is decreasing, the process will branch from step 905 to step 920, where the clock speed is changed first to the new clock speed. It will be safe to perform this change in clock speed first, as any decrease in clock speed will increase the time available for signals to traverse each path portion, and hence will not result in any functional failure in that respect. Thereafter, at step 925, the controller 825 can be programmed with the new values appropriate for the new clock speed as determined from the appropriate predetermined setup information provided for that new clock speed. As discussed earlier, this will result in a revised set of enable signals being sent to the selectable register slices to cause each register slice to be selected or bypassed as defined by those values.

The process then returns to step 900 to await detection of a subsequent change in clock speed.

Figure 12:
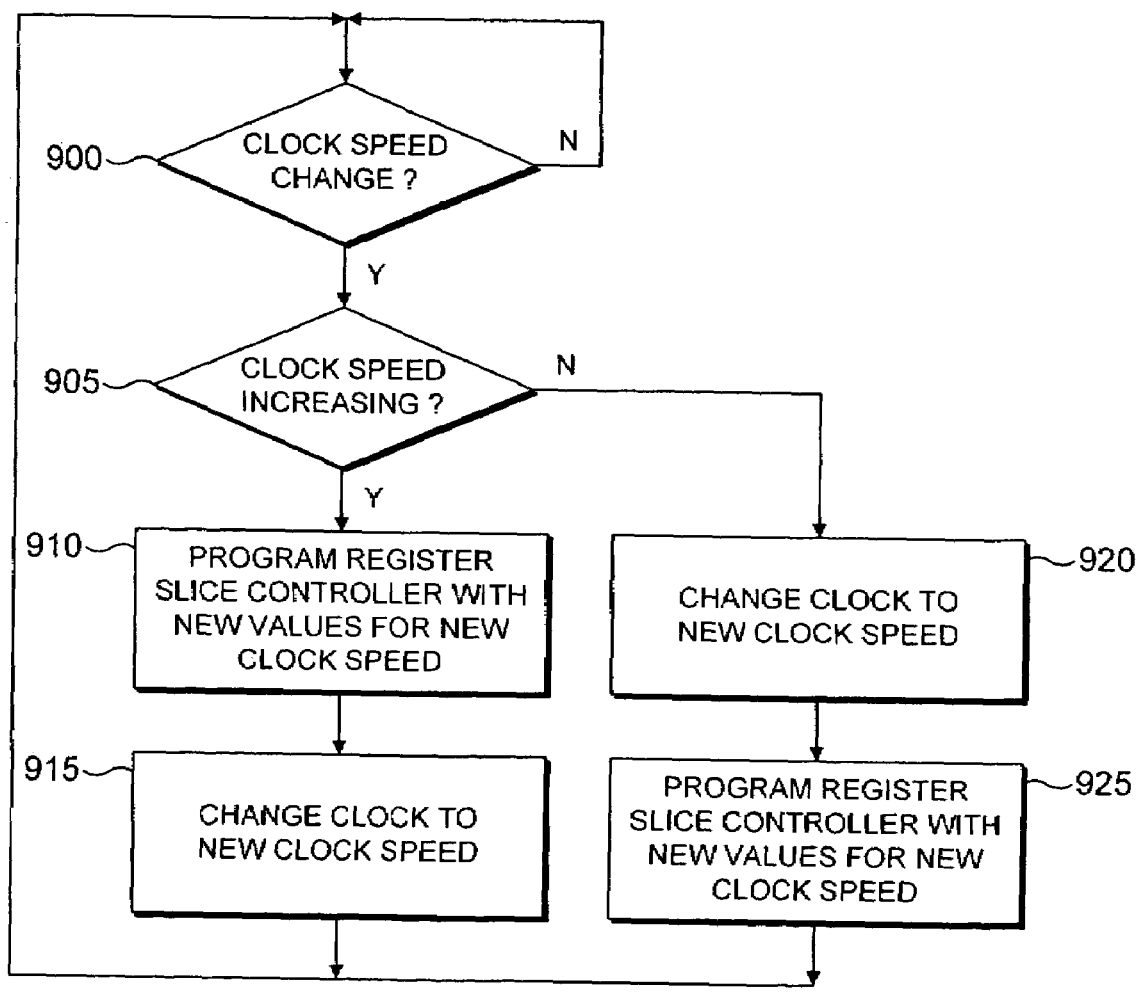
FIG. 12 is a flow diagram illustrating how the use of such selectable register slices can allow dynamic configuration of the bus interconnect block of FIG. 11 to take account of a change in operating conditions.

It will be appreciated that whilst FIG. 12 has been shown with regards to a change in clock speed, a similar sequence of flow could be performed for any other operating condition change, for example a change in supply voltage. If the supply voltage is changing, it will be appreciated that the appropriate determination to make at the equivalent to step 905 will be a determination as to whether the supply voltage is decreasing. If the supply voltage is decreasing, this will reduce the speed with which signals traverse particular connections, and hence may have the potential for a functional failure to occur, unless the controller 825 is programmed with the new values prior to changing the voltage.

In a fourth embodiment, a dynamic test procedure is performed in order to determine the setup information, as discussed earlier with reference to the second embodiment, but in this instance the dynamic test is not just performed at boot time, but is instead performed dynamically as and when operating conditions are to change. This approach has the advantage that it allows each device to adapt to its operating environment, and further takes account of changes in the operating conditions in order to ensure that a setup is used which is appropriate for each different operating condition. An example of a process which may be performed to allow such dynamic configuration using a dynamic test procedure will be discussed further with reference to FIG. 13.

Figure 13:
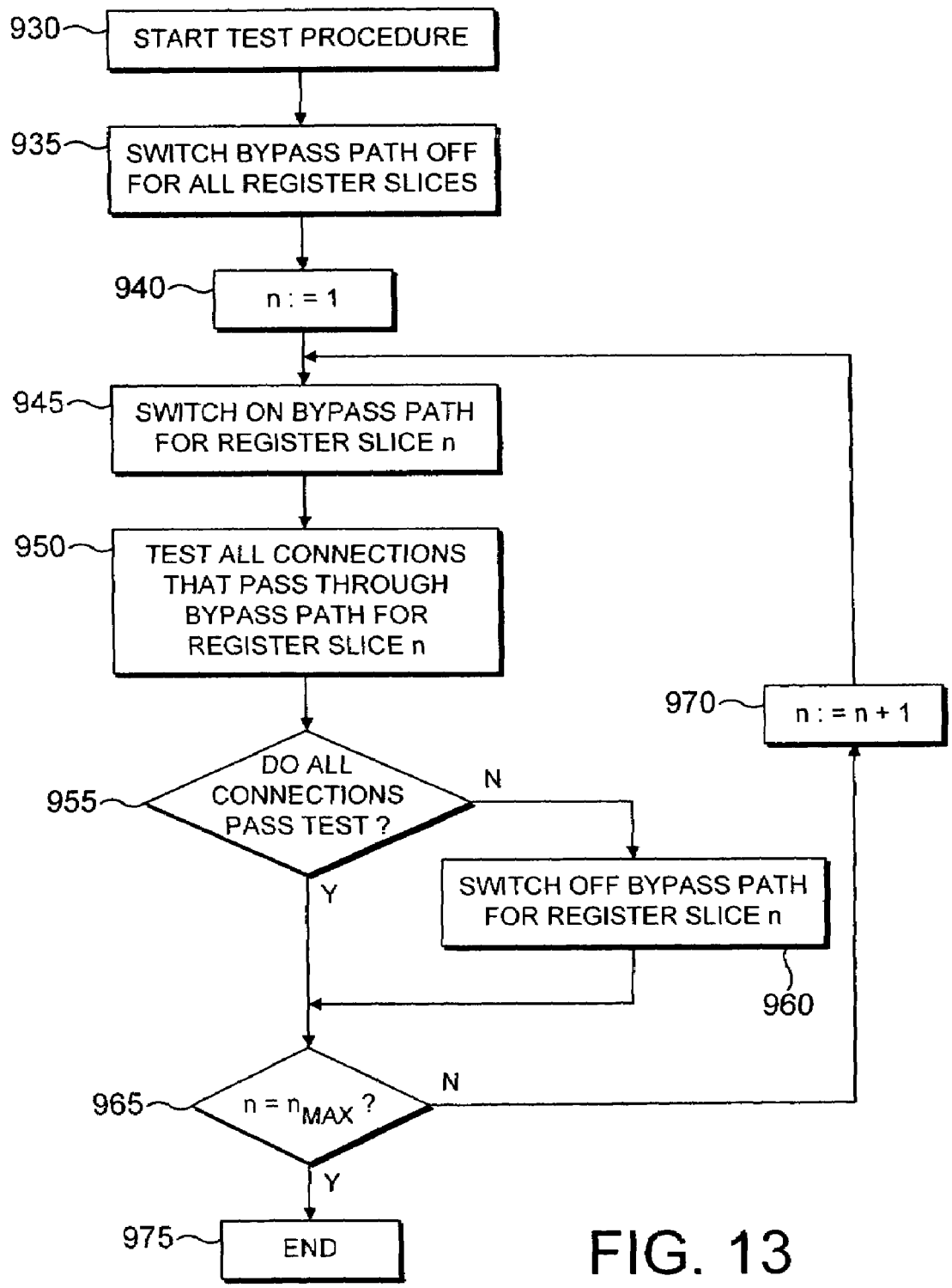
FIG. 13 is a flow diagram illustrating an alternative technique which allows dynamic configuration of the bus interconnect block of FIG. 11 to take account of a change in operating conditions, in which a test procedure is performed in order to determine the appropriate setup for the selectable register slices.

At boot time, or whenever a change in operating condition, such as clock speed, supply voltage, etc is required, the test procedure of FIG. 13 is employed. At step 930, the test procedure is initiated, whereafter at step 935 the bypass path is switched off for all selectable register slices. This will hence ensure that on the first iteration the configuration will pass the test procedure since the selectable register slices will have been included in the design to take account of the worst case scenario for signal timing, for example the highest clock speed/lowest supply voltage combination.

At step 940, a variable n is set equal to one, whereafter at step 945 the bypass path for register slice n is switched on. There will be a total number of selectable register slices that it is determined are candidates to test for bypassing, referred to herein as $n_{MAX}$, and each such register slice will have a unique value of n associated therewith. It will be appreciated that the value of n associated with each register slice could be arbitrary, or alternatively could be chosen such that the register slices with the lower values of n are the register slices that are most likely to be candidates for bypassing.

Thereafter, at step 950, all connections that pass through the bypass path for register slice n are then subjected to a timing test. As discussed earlier, this will typically involve the transmission of a variety of signals over those connections, to detect whether those signals can safely traverse the affected path portion within a single clock cycle. At step 955 it is determined whether all connections have passed the test procedure, i.e. whether all signals have traversed the required path portions in a single clock cycle. If so, then the process proceeds to step 965, where it is determined whether n is equal to n max. Alternatively, if not all connections pass the test, the process proceeds to step 965 via step 960, where the bypass path for register slice n is switched off. If the test has failed for any particular connection, this indicates that the register slice being considered is not an appropriate register slice to bypass, and hence switching the bypass path off at step 960 is an appropriate course of action.

If at step 965 it is determined that n equals $n_{MAX}$, then the process ends at step 975, since in this instance all of the selectable register slices that it was considered appropriate to test will have been tested. If at step 965 it is determined that n does not equal $n_{MAX}$, then n is incremented by one at step 970, whereafter the process returns to step 945.

By this approach, it can be seen that the bypassing of each register slice can be tested in turn, in order to determine an appropriate selection of register slices applicable to the particular operating conditions. It will be appreciated that the test procedure will be performed for the new condition being transitioned to, and as discussed earlier can be arranged to allow for some timing variations that may occur as a result of fluctuations in the operating environment of the apparatus.

Figure 14:
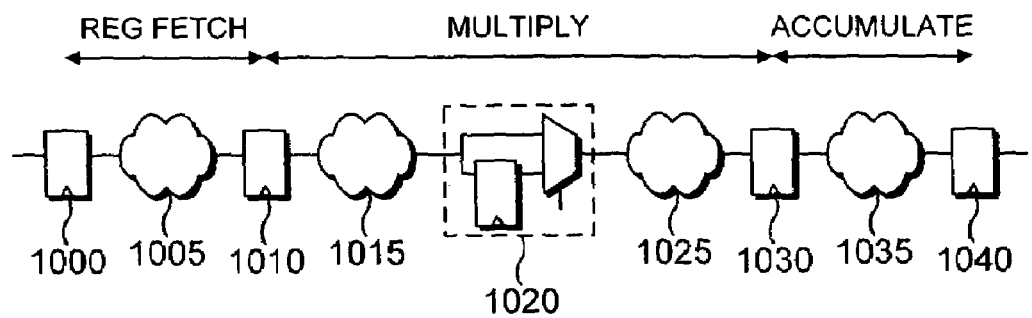
FIG. 14 is a flow diagram illustrating a pipelined data processing unit in which a selectable register slice is provided to enable a change in the number of pipeline stages dependent on operating conditions.

The concept of dynamically selecting either a register slice or a bypass path is applicable not only for data processing apparatus incorporating a bus interconnect block such as that illustrated with reference to FIG. 11, but also for other components of a data processing apparatus. For example, the selectable register slice approach could be used within a pipelined data processing apparatus where there is an imbalance in the amount of logic in each of the pipeline stages. Such a data processing apparatus is illustrated in FIG. 14, where a pipeline is shown for performing a multiply-accumulate operation. Each pipeline stage is delimited by a register slice 1000, 1010, 1020, 1030, 1040, respectively. As can be seen, logic elements 1005 are provided in one pipeline stage for fetching the operand values required, whereafter logic elements 1015 and 1025 are provided for performing the multiply operation. When the selectable register slice 1020 is selected, this multiplication takes place in two pipeline stages, whereas if the selectable register slice 1020 is bypassed, this multiply process takes place in a single pipeline stage. Thereafter, logic elements 1035 are used in a further pipeline stage to perform the accumulate operation.

Using a selectable pipeline stage as illustrated with reference to FIG. 14 allows the pipeline depth to be adapted to suit the requirements of the system. The benefit of such an approach is that it allows a single design to be adapted to suit different customer requirements. For example, one customer may desire a low "cycles per instruction" (CPI), but only require a low clock frequency, i.e. this customer may desire efficiency rather than outright speed. However, another customer may require a high clock frequency and is prepared to accept an increase in CPI to meet their target clock speed. Both requirements can be met through the use of such selectable register slices, whereby those selectable register slices can either be selected or bypassed dependent on the requirements.

In addition, the provision of such selectable register slices allows the dynamic adaptation of the pipeline depth according to the operating conditions, in particular allowing a trade-off of pipeline depth (i.e. number of clock cycles for performing each operation) against voltage and clock speed. There are a number of ways in which such a change could be effected when it is determined that it is appropriate having regard to the operating conditions. In one embodiment, the pipelined data processing unit could first be drained of instructions, whereafter the number of pipeline stages could then be altered by appropriate selection or bypassing of selectable register slices, prior to the pipelined data processing unit beginning to receive further instructions. However, in an alternative embodiment, a particular instruction could be issued into the pipeline to cause the change to be invoked.

Two examples where the dynamic adaptation of the pipeline depth according to the operating conditions may be desirable are as follows:

1. If the system is required to operate at a given clock speed, but it is desirable to reduce the voltage (for example because some components which require full supply voltage are currently powered down), then dynamically increasing the pipeline depth may allow a processor to operate at the same clock speed with reduced voltage.
2. If a system is operating at a fixed voltage but it becomes possible to reduce the clock frequency (for example because the current performance requirements of the system are lowered), then it may be possible to dynamically reduce the pipeline depth since more time is available in each cycle, thus lowering the CPI and improving the energy consumption of the system.

Figure 15:
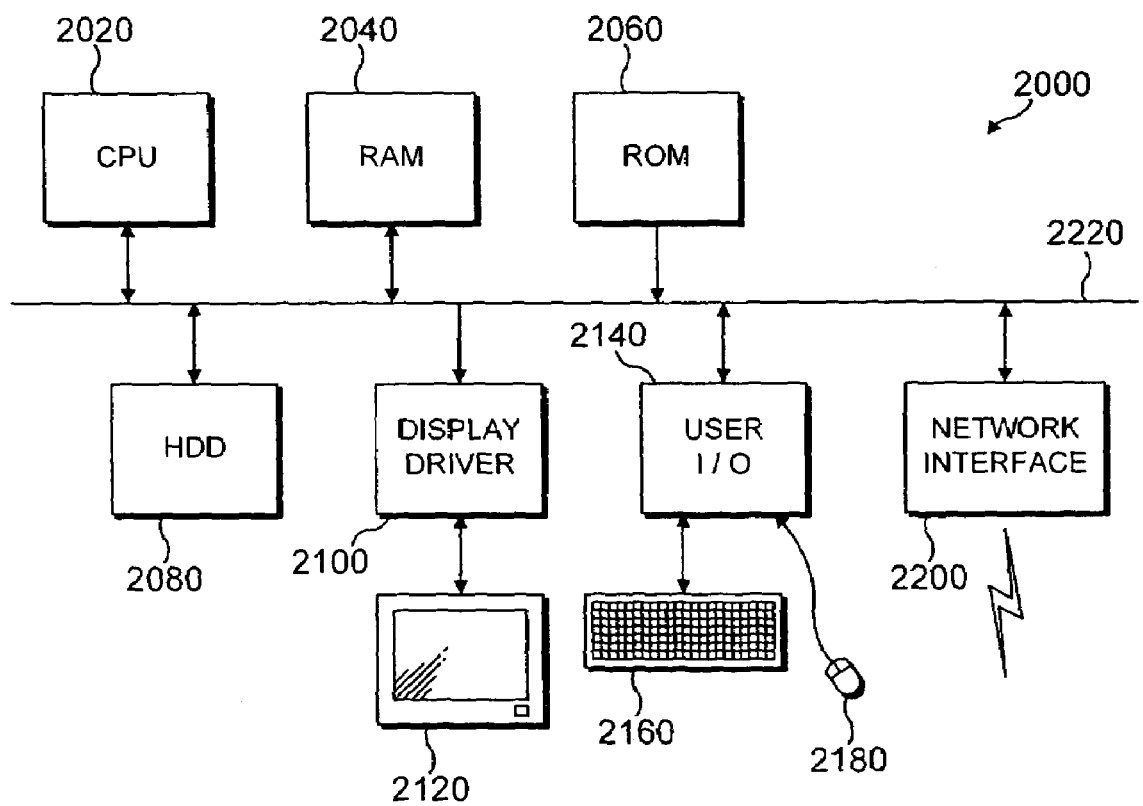
FIG. 15 is a block diagram of a computer system in which the design processes of embodiments can be performed.

FIG. 15 schematically illustrates a computer 2000 of a type that may be used to execute computer programs to perform the design functions described above. The computer 2000 includes a central processing unit 2020, a random access memory 2040, a read-only memory 2060, a hard disk drive 2080, a display driver 2100 and display 2120, a user input/output circuit 2140, a keyboard 2160, a mouse 2180 and a network interface unit 2200, all coupled via a common bus 2220. In operation, the central processing unit 2020 executes computer programs using the random access memory 2040 as its working memory. The computer programs may be stored within the read-only memory 2060, the hard disk drive 2080, or retrieved via the network interface circuit 2200 from a remote source. The computer 2000 displays the results of its processing activity to the user via the display driver 2100 and the display 2120. The computer 2000 receives control inputs from the user via the user input/output circuit 2140, the keyboard 2160 and the mouse 2180.

The tool used to modify the design of a bus interconnect block described herein may take the form of one or more computer programs stored within the computer system 2000 on the hard disk drive 2080, within the random access memory 2040, within the read-only memory 2060, or downloaded via the network interface circuit 2200. The computer program(s) may also be provided on a recording medium such as a compact disk or floppy disk drive that may be used for distribution purposes. When operating under the control of the above described computer program(s), the various components of the computer 2000 serve to provide the appropriate circuits and logic for carrying out the above described functions and acts. It will be appreciated that the computer 2000 illustrated in FIG. 15 is merely one example of a type of computer that may execute the computer program(s) and the methods described above.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A method of modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each path having one or more path portions separated by storage elements, each storage element, during a particular clock cycle, for outputting a stored value of a signal while a new value of that signal is stored in that storage element, the method comprising the steps of:
   a) selecting one or more candidate paths from said paths;
   b) for each candidate path, applying predetermined criteria to determine whether modification of the number of storage elements in said path will assist in meeting the requirement for said chosen characteristic; and
   c) modifying the number of storage elements in each candidate path for which it is determined at said step (b) that modification will assist in meeting the requirement for said chosen characteristic.

2. A method of modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each path having one or more path portions separated by storage elements, the method comprising the steps of:
   a) selecting one or more candidate paths from said paths;
   b) for each candidate path, applying predetermined criteria to determine whether modification of the number of storage elements in said path will assist in meeting the requirement for said chosen characteristic; and
   c) modifying the number of storage elements in each candidate path for which it is determined at said step (b) that modification will assist in meeting the requirement for said chosen characteristic, wherein the chosen characteristic is a timing characteristic, the requirement is an improvement in said timing characteristic, and the method comprises the steps of:
   at said step (a), selecting as said one or more candidate paths one or more paths via which the bus interconnect block outputs signals to said master or slave devices;
   at said step (b), determining for each candidate path whether the time taken to output valid signals from the bus interconnect block exceeds a first predetermined threshold; and
   if so, at said step (c) inserting a storage element in that candidate path to increase the number of path portions in that candidate path.

3. A method of modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each path having one or more path portions separated by storage elements, the method comprising the steps of:
   a) selecting one or more candidate paths from said paths;
   b) for each candidate path, applying predetermined criteria to determine whether modification of the number of storage elements in said path will assist in meeting the requirement for said chosen characteristic; and
   c) modifying the number of storage elements in each candidate path for which it is determined at said step (b) that modification will assist in meeting the requirement for said chosen characteristic, wherein the chosen characteristic is a timing characteristic, the requirement is an improvement in said timing characteristic, and the method comprises the steps of:
   at said step (a), selecting as said one or more candidate paths one or more paths via which the bus interconnect block receives signals from said master or slave devices;
   at said step (b), determining for each candidate path whether the setup time taken to receive said signals exceeds a second predetermined threshold; and
   if so, at said step (c) inserting a storage element in that candidate path to increase the number of path portions in that candidate path.

4. A method modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each oath having one or more path portions separated by storage elements, the method comprising the steps of:

a) selecting one or more candidate paths from said paths;
b) for each candidate path, applying predetermined criteria to determine whether modification of the number of storage elements in said path will assist in meeting the requirement for said chosen characteristic; and
c) modifying the number of storage elements in each candidate path for which it is determined at said step (b) that modification will assist in meeting the requirement for said chosen characteristic, wherein the chosen characteristic is a timing characteristic, the requirement is an improvement in said timing characteristic, and the method comprises the steps of:

at said step (a), selecting as said one or more candidate paths one or more paths incorporating combinatorial logic;
at said step (b), determining for each candidate path whether the time taken to process signals by that combinatorial logic exceeds a third predetermined threshold; and
if so, at said step (c) inserting a storage element in that candidate path to increase the number of path portions in that candidate path.

5. A method of modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each path having one or more path portions separated by storage elements, the method comprising the steps of:

a) selecting one or more candidate paths from said paths;
b) for each candidate path, applying predetermined criteria to determine whether modification of the number of storage elements in said path will assist in meeting the requirement for said chosen characteristic; and
c) modifying the number of storage elements in each candidate path for which it is determined at said step (b) that modification will assist in meeting the requirement for said chosen characteristic, wherein the chosen characteristic is a timing characteristic, wherein the design of the bus interconnect block includes a plurality of provisional storage elements that are candidates for removal, and wherein the requirement is for the modification not to introduce any path portions which signals cannot traverse in a predetermined maximum time, the method comprising the steps of:

specifying as the predetermined maximum time a duration of a clock cycle for the bus interconnect block;
at said step (a), selecting as said one or more candidate paths one or more paths including at least one provisional storage element;
at said step (b), determining for each candidate path whether removal of said at least one provisional storage element will result in a new path portion which signals can traverse in a time not exceeding the duration of the clock cycle; and
if so, at said step (c) removing said at least one provisional storage element from that candidate path to reduce the number of path portions in that candidate path.

6. A method as claimed in claim 5, wherein if any candidate path includes more than one provisional storage element, then at said step (b) the determination is performed based on the removal of a selected subset of said provisional storage elements in that candidate path.

7. A method of modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each path having one or more path portions separated by storage elements, the method comprising the steps of:

a) selecting one or more candidate paths from said paths;
b) for each candidate path, applying predetermined criteria to determine whether modification of the number of storage elements in said path will assist in meeting the requirement for said chosen characteristic; and
c) modifying the number of storage elements in each candidate path for which it is determined at said step (b) that modification will assist in meeting the requirement for said chosen characteristic, wherein the chosen characteristic is a timing characteristic, the requirement is an improvement in said timing characteristic, the method comprising the steps of:

specifying a duration of a clock cycle for the bus interconnect block;
at said step (a), selecting as said one or more candidate paths one or more paths including an unacceptable path portion which signals are unable to traverse in the duration of the clock cycle;
at said step (b), applying predetermined criteria to determine for each candidate path, on the assumption that at least one storage element is inserted in the unacceptable path portion to produce a modified design, whether the timing characteristic of the modified design is improved with respect to the timing characteristic of the unmodified design; and
if so, at said step (c) inserting the at least one storage element in that unacceptable path portion to increase the number of path portions in the candidate path.

8. A method as claimed in claim 7, wherein the step of applying predetermined criteria comprises determining whether the time taken for signals to traverse the longest unacceptable path portion in the modified design is less than the time taken for signals to traverse the longest unacceptable path portion in the unmodified design.

9. A method as claimed in claim 7, wherein the step of applying predetermined criteria comprises determining whether the number of unacceptable path portions in the modified design is less than the number of unacceptable path portions in the unmodified design.

10. A method as claimed in claim 1, further comprising the step of: repeating said steps (a) to (c) for a further selection of candidate paths.

11. A method as claimed in claim 7, further comprising the step of repeating said steps (a) to (c) for a further selection of candidate paths, and wherein said steps (a) to (c) are repeated until a modified design is generated in which there are no unacceptable path portions.

12. A method of modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each path having one or more path portions separated by storage elements, the method comprising the steps of:

a) selecting one or more candidate paths from said paths;

b) for each candidate path, applying predetermined criteria to determine whether modification of the number of storage elements in said path will assist in meeting the requirement for said chosen characteristic; and c) modifying the number of storage elements in each candidate path for which it is determined at said step (b) that modification will assist in meeting the requirement for said chosen characteristic, wherein the chosen characteristic is power consumption, the requirement is a reduction in said power consumption and the method comprises the steps of:

at said step (a), selecting as said one or more candidate paths one or more paths via which the bus interconnect block interfaces with associated master or slave devices;

at said step (b), applying predetermined criteria to determine for each candidate path whether it is appropriate to isolate the associated master or slave devices to reduce power consumption; and if so, at said step (c) inserting a storage element in that candidate path to isolate the associated master or slave devices, thereby increasing the number of path portions in that candidate path.

13. A method as claimed in claim 12, wherein the step of applying predetermined criteria comprises determining based on a function of the number of associated master and slave devices for that candidate path and the bandwidth of the interconnect block used by those associated master or slave devices whether it is appropriate to isolate that associated master or slave device.

14. A method of modifying a design of a bus interconnect block for a data processing apparatus in order to meet a requirement for a chosen characteristic of the bus interconnect block, the bus interconnect block providing a plurality of connections via which one or more master devices may access one or more slave devices, each connection comprising one or more paths, each path having one or more path portions separated by storage elements, the method comprising the steps of:

a) selecting one or more candidate paths from said paths;

b) for each candidate path, applying predetermined criteria to determine whether modification of the number of storage elements in said path will assist in meeting the requirement for said chosen characteristic; and c) modifying the number of storage elements in each candidate path for which it is determined at said step (b) that modification will assist in meeting the requirement for said chosen characteristic, wherein said storage elements are register slices operable to store a group of signals received over an associated path portion.

15. A computer program product comprising a computer readable medium containing computer readable instructions that configure a computer to perform the method of claim 1.

* * * * *